(12) United States Patent
Dai

(10) Patent No.: US 8,331,671 B2
(45) Date of Patent: Dec. 11, 2012

(54) IMAGE PROCESSING APPARATUS AND IMAGE ENCODING METHOD RELATED TO NON-PHOTO IMAGE REGIONS

(75) Inventor: Xiaoyan Dai, Yokohama (JP)

(73) Assignee: Canon Kabushiki Kaisha (JP)

( * ) Notice: Subject to any disclaimer, the term of this patent is extended or adjusted under 35 U.S.C. 154(b) by 894 days.

(21) Appl. No.: 12/432,261

(22) Filed: Apr. 29, 2009

(65) Prior Publication Data

US 2009/0274363 A1 Nov. 5, 2009

(30) Foreign Application Priority Data

May 2, 2008 (JP) .................................. 2008-120763

(51) Int. Cl.
*G06K 9/34* (2006.01)

(52) U.S. Cl. ........ 382/176; 382/166; 382/180; 382/203; 382/239; 250/208.1; 348/222.1

(58) Field of Classification Search .................. 382/166, 382/176, 180, 203, 232, 239; 250/208.1; 348/222.1

See application file for complete search history.

(56) References Cited

U.S. PATENT DOCUMENTS

| | | | |
|---|---|---|---|
| 5,680,478 A | 10/1997 | Wang et al. | |
| 5,757,961 A | 5/1998 | Yamakawa et al. | |
| 6,987,886 B1 * | 1/2006 | Okubo et al. | 382/194 |
| 7,133,565 B2 | 11/2006 | Toda et al. | |
| 2005/0180645 A1 | 8/2005 | Hasegawa et al. | |
| 2006/0045386 A1 | 3/2006 | Fukuoka et al. | |
| 2007/0025617 A1 * | 2/2007 | Dai et al. | 382/180 |
| 2007/0230810 A1 * | 10/2007 | Kanatsu | 382/243 |

FOREIGN PATENT DOCUMENTS

| | | |
|---|---|---|
| JP | 2885999 B2 | 2/1999 |
| JP | 2002-77633 A | 3/2002 |
| JP | 2004-265384 A | 9/2004 |
| JP | 2005-12768 A | 1/2005 |
| JP | 2005184403 A | 7/2005 |
| JP | 2006262232 * | 9/2006 |
| JP | 2006-344069 A | 12/2006 |
| JP | 2007335982 A | 12/2007 |

OTHER PUBLICATIONS

Office Action issued Mar. 30, 2012 for corresponding JP2008-120763.

* cited by examiner

*Primary Examiner* — Chan S Park
*Assistant Examiner* — Eueng-Nan Yeh
(74) *Attorney, Agent, or Firm* — Rossi, Kimms & McDowell LLP

(57) ABSTRACT

A region separation unit separates an inputted color document image into a plurality of types of regions such as a character region, a clip art region and a photo image region, and a clip art region extraction unit identifies the clip art region from among the separated regions. A clip art region dividing unit divides the clip art region based on the color features of the clip art region, and a clip art background identify unit identifies the background portion of the clip art region from among the divided regions. A filling unit for filling portions other than the background of a clip art fills a portion of the clip art other than the background with the background color, and a JPEG compression unit compresses the result obtained from the process for filling a clip art portion.

17 Claims, 21 Drawing Sheets

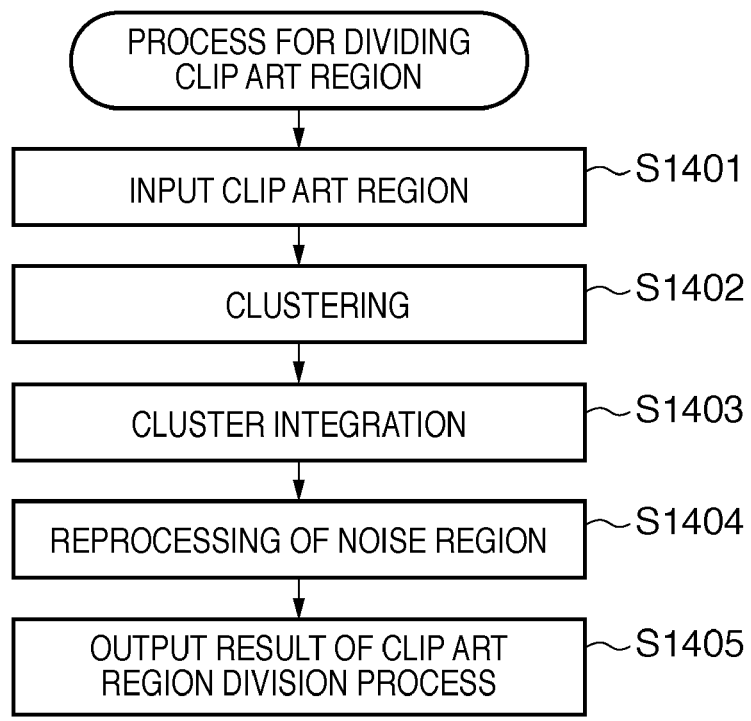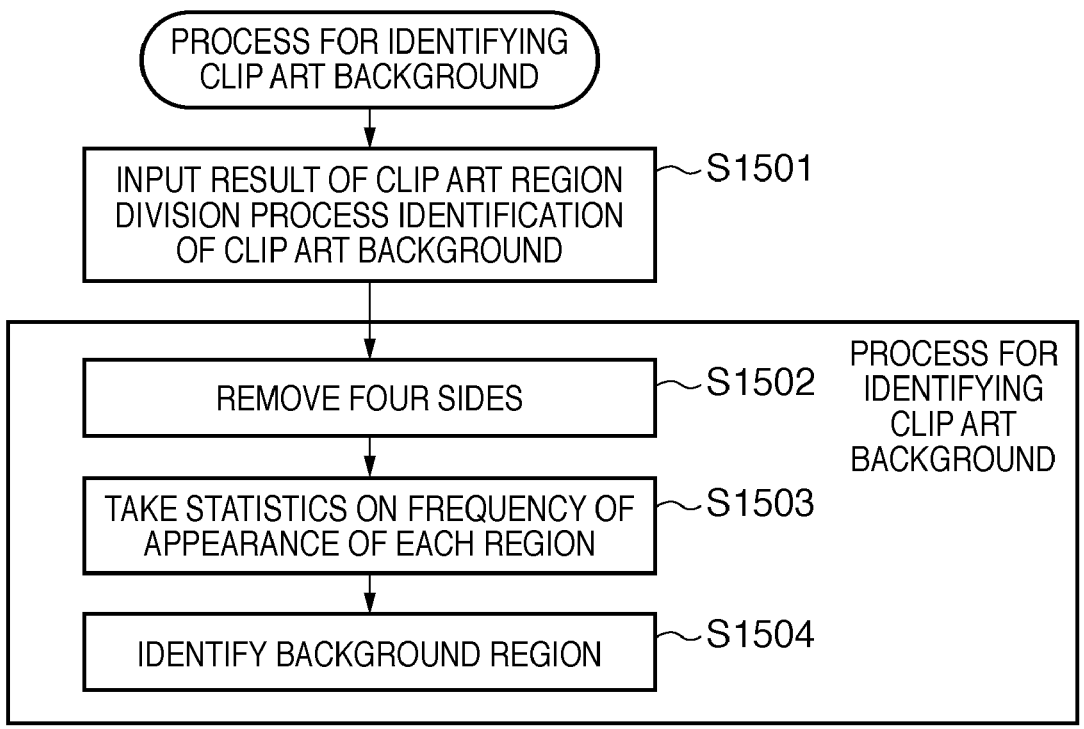

IMAGE PROCESSING APPARATUS AND IMAGE ENCODING METHOD RELATED TO NON-PHOTO IMAGE REGIONS

BACKGROUND OF THE INVENTION

1. Field of the Invention

The present invention relates to an image processing apparatus that compresses document images and an image encoding method, and more particularly to an image processing apparatus that compresses a document image including a non-photo image and an image encoding method.

2. Description of the Related Art

Along with the recent digitization of information, rather than storing paper documents, systems are becoming widely available that digitize information through scanning using a scanner or the like, and transmit/receive the electronic data to/from other apparatuses. In order to reduce the cost required for transmission and reception, compressing digitized documents at high ratios is in demand. At the same time, reusability, which is the ability to partially edit the digitized data, as well as the ability to achieve high image quality while preventing degradation of the image quality even when images are enlarged or reduced are also in demand.

However, when a document image including both a character region and a photo image region is compressed at a compression ratio suitable for the character region (e.g., lossless compression), a problem arises in that although the image quality after decoding is good, the compression ratio is low. On the other hand, when the document image is compressed at a compression ratio suitable for the photo image region (e.g., lossy compression such as JPEG), a problem arises in that although a high compression ratio is achieved, the quality of decoded characters is poor. To address this, for example, Japanese Patent Laid-Open Nos. 2002-077633 and 2005-012768 propose techniques in which a character region is extracted from a document image, and the image of the character region is compressed with a character compression scheme (MMR etc.) whereas the base portion after the character region has been extracted is filled and compressed with a compression scheme (JPEG) suitable for photos and the like. As the filling method, for example, techniques have been proposed such as a technique in which the character region is filled with the average color of the surrounding pixels, and a technique in which the character region is filled with a color determined in accordance with the histogram information of the character region.

Japanese Patent Laid-Open No. 2004-265384 proposes a technique for achieving a high compression ratio, reusability and high image quality by separating a digitized document image into a character region and a photo image region, converting the character region or the like, for which reusability and high image quality are required, into vector data, compressing the photo image region or the like, which cannot be reproduced easily with vector data, into JPEG format, synthesizing the vectorized result of the character region and the JPEG compression result of the photo image region, and outputting the synthesized result. Specifically, region separation is first performed on the document image to identify the character region and the line drawing region as rectangular regions. Then, character objects and line drawings that can be vectorized are vectorized, and the obtained vector data is stored in a vector layer. Regions that are not vectorized and image regions where the vectorized character region have been filled are compressed in the JPEG format, and the obtained JPEG data is stored in a JPEG layer. These vector layer data and the JPEG layer data are stored as a compressed document file.

In order to improve high compression performance, reusability, and high image quality performance for document images, Japanese Patent Laid-Open No. 2006-344069 proposes a technique with which a target to be vectorized is enlarged, and non-photo images such as illustrations, which have hitherto been compressed in the JPEG format as is the case with photos, are vectorized. The non-photo images are also called as "illustrations" or "clip art images", and they have features such as clear outline of an object, and a limited number of colors appearing therein. The term "non-photo image" used herein may be construed as including a character and a line drawing. However, it should be understood that, in the case of a configuration in which an image region from which a character region and a line drawing region have been separated is further separated into a photo image region and a non-photo image region, the image region includes no characters and line drawings at the point in time when it is separated into a photo image region and a non-photo image region.

Furthermore, photo image regions are often placed as rectangular images in document images, whereas compared to photo image regions, non-photo image regions, such as illustrations, are more often drawn as images with shapes other than a rectangle. In addition, when the region separation process is performed for an image, the range of regions such as a character region and graphic region is defined by a circumscribed rectangle, so it is often the case that an illustration region includes another image in addition to the illustration itself, such as the background.

When a rectangular illustration region (clip art region) is vectorized using the technique of Japanese Patent Laid-Open No. 2006-344069, the background portion is treated in the same manner as illustrations and is vectorized as a single-color region with the average color of the background portion as a representative color. However, in such an illustration region, a situation can occur in which the background portion outside the illustration portion has subtle color gradation, rather than a single color. The "subtle color gradation" used herein means color gradation that actually varies slightly although it is determined as having a single color when clustered in colors. For example, a graphic region 34 shown in FIG. 22 includes illustration images (circular image portions) and a background region with subtle color gradation. When color clustering is performed on the graphic region 34, the illustrations are clustered in colors, and at the same time, the background portion is also extracted as a single region, and the representative color of the background portion is also calculated in the same manner as the illustrations. Specifically, when the background portion with such color gradation is treated as having a single color, the difference from the original image increases, causing a strong sense of discomfort. Accordingly, it is actually desired to allow the background with subtle color gradation to remain as original, rather than subjecting the background portion to the same process as the illustrations and treating it as having a single color.

Also, in a document image including a non-photo image region, a situation can occur in which the document image includes a non-photo image region (namely, a rectangular non-photo image region 33 as shown in FIG. 15) and a photo image region 31 overlapping the non-photo image region, or in other words, when the photo image region is overlapping the background portion outside the illustration. In the case of such an image, first, the non-photo image region (illustration region) is extracted, and the extracted non-photo image region is vectorized. On the other hand, in the document image from which the non-photo image region has been extracted, a region corresponding to the non-photo image region is filled and compressed in the JPEG format. In this case, a problem arises in that part of the photo image region overlapping the non-photo image region disappears as shown in FIG. 17 because the whole non-photo image region is filled, making it impossible to reproduce the original image.

SUMMARY OF THE INVENTION

The present invention provides an image processing apparatus that increases the compression ratio of a document image including a non-photo image region and improves the quality and reusability of image objects included in the document image when reproduced, and an image encoding method.

The present invention includes the following configuration.

According to one aspect of the present invention, there is provided an image processing apparatus that encodes a document image including a non-photo image region, the apparatus comprising: a region identify unit adapted to perform region separation on a document image and identify a non-photo image region; a first encoder adapted to encode the non-photo image region through a vectorization process; a background identify unit adapted to identify a background region from the non-photo image region; a filling unit adapted to fill a region other than the background region of the non-photo image region with a color of the background region; and a second encoder adapted to encode the document image after the region other than the background region of the non-photo image region has been filled by the filling unit, through an image compressing process.

According to the present invention, it is possible to improve both the compression performance and reusability of document images including a non-photo image region, and to reproduce high quality document images.

Further features of the present invention will become apparent from the following description of exemplary embodiments with reference to the attached drawings.

BRIEF DESCRIPTION OF THE DRAWINGS

FIG. 4 is a flowchart used to illustrate an overview of a process for dividing a clip art region according to Embodiment 1 of the present invention.

FIG. 5 is a flowchart used to illustrate an overview of a process for identifying the background of a clip art according to Embodiment 1 of the present invention.

DESCRIPTION OF THE EMBODIMENTS

Hereinafter, a process for filling a non-photo image region and a process for generating a synthesized document file with use of an image processing apparatus according to the present invention will be described in detail with reference to the accompanying drawings.

Embodiment 1

Configuration of Apparatus

Figure 1:
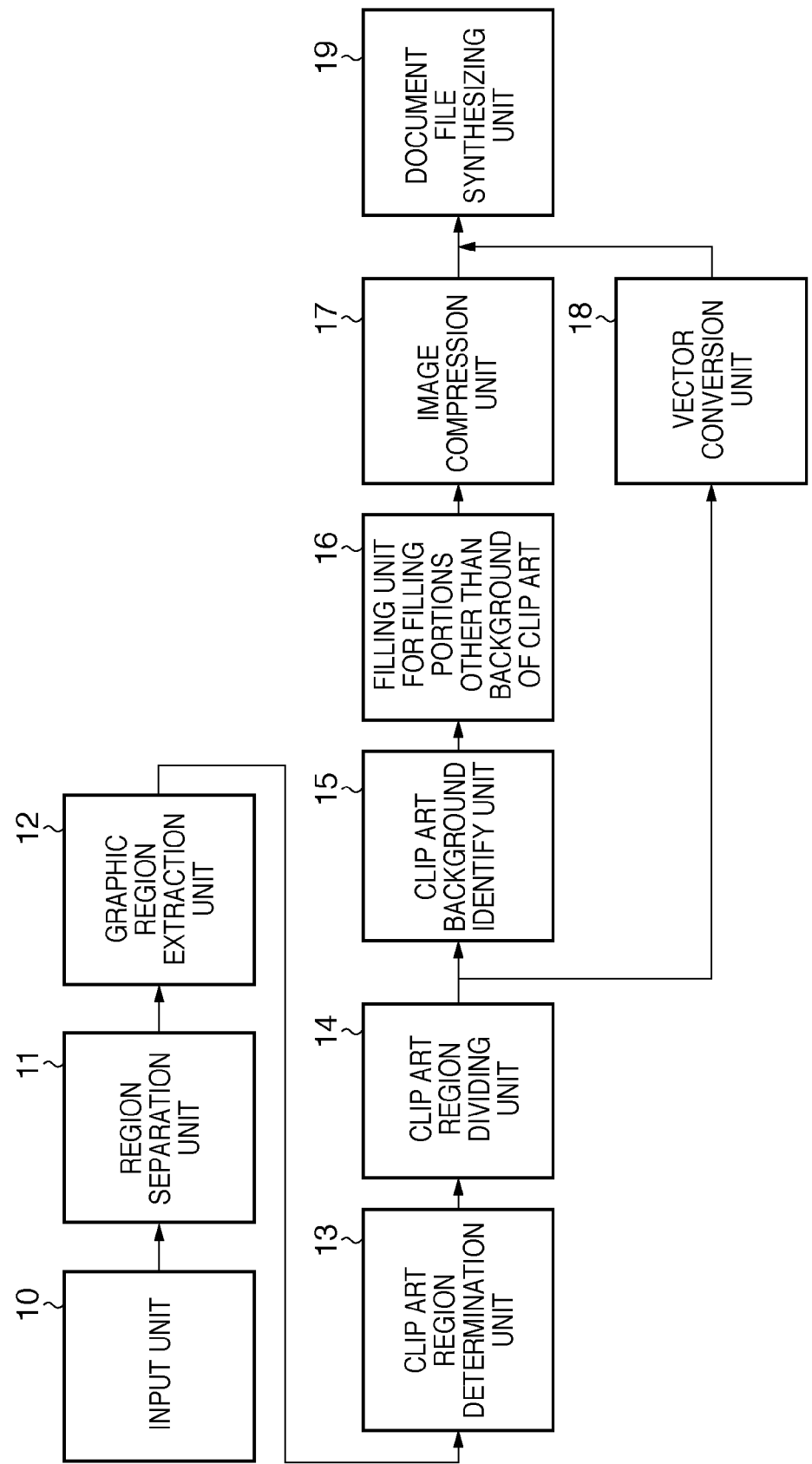
FIG. 1 is a block diagram illustrating the configuration of an image processing apparatus having a function for performing a process for filling a clip art region and a process for generating a synthesized document file according to Embodiment 1 of the present invention.

FIG. 1 is a block diagram illustrating the configuration of an image processing apparatus that has a function for performing a process for filling a non-photo image region and a process for generating a synthesized document file according to Embodiment 1 of the present invention. As used herein, "synthesized document file" refers to a document file in which a photo image portion has been compressed in a format such as JPEG, and characters and a non-photo image have been vectorized and compressed. In other words, it can be said that this apparatus is an apparatus that executes an image encoding method. In FIG. 1, an input unit 10 is a unit that inputs paper information as a color document image through scanning, and a region separation unit 11 is a unit that separates the color document image into a plurality of types of regions such as a character region, a graphic region, and a line drawing region. Through the region separation process, an attribute is assigned to each region. In the region separation process of the present embodiment, the color document image is binarized, an element comprising linked black pixels in the binary image is extracted from the binary image, and separation is performed based on rectangular regions that circumscribe the extracted element comprising linked black pixels. At this time, the attribute of each region is determined based on the size of the rectangular region, the aspect ratio, the black pixel density, and so on. The region separation process is not limited to this technique, and it is possible to use any known technique. A graphic region extraction unit 12 is a unit that extracts a graphic region (a region to which a graphic attribute has been assigned) from among a plurality of types of separated regions. In the present embodiment, it is assumed that examples of the graphic region include a photo image region (halftone region) and a non-photo image region such as an illustration (also referred to as a "clip art"). When the region extraction is performed on a binary image, it is often the case that the photo region and the clip art region are extracted as the same type (graphic) of region because they are large in size and have high black pixel densities. Accordingly, in the next process, a clip art (illustration) region is determined from the graphic region group, and then extracted therefrom.

A clip art region determination unit 13 is a unit that determines a clip art region from the graphic region. A clip art region dividing unit 14 is a unit that divides the pixels within the clip art region into regions (also referred to as "clusters") based on the color features. A clip art background identify unit 15 is a unit that identifies the background pixel portion from the clip art region based on the result obtained from the region division process. A filling unit 16 for filling portions other than the background of a clip art is a unit that fills a portion other than the background of the clip art region of the color document image with the background color. An image compression unit 17 is a unit that compresses the color document image whose clip art portion has been filled by the filling unit 16. A vector conversion unit 18 is a unit that converts the pixels of clusters determined as not constituting the background of the clip art region based on the result of the clip art region division process into vector data (i.e., generates vector data). A document file synthesizing unit 19 is a unit that synthesizes the compressed data of a compressed data layer and the vector data of a vector layer into a multilayer compressed document image file, and outputs (or saves) the file. In the above, the case in which a clip art region is vectorized was described with reference to FIG. 1, but it is also possible to convert a character region and a line drawing region into vector data by the vector conversion unit, and store them in a compressed document image file. When vectorizing the character region and the line drawing region, it is desirable that they are vectorized by vectorization techniques suitable for the respective regions. When reproducing the compressed document image file, the document is reproduced by causing an image obtained by reproducing the vector data of the vector layer to overlap an image obtained by reproducing the compressed image of the compressed data layer.

Figure 14:
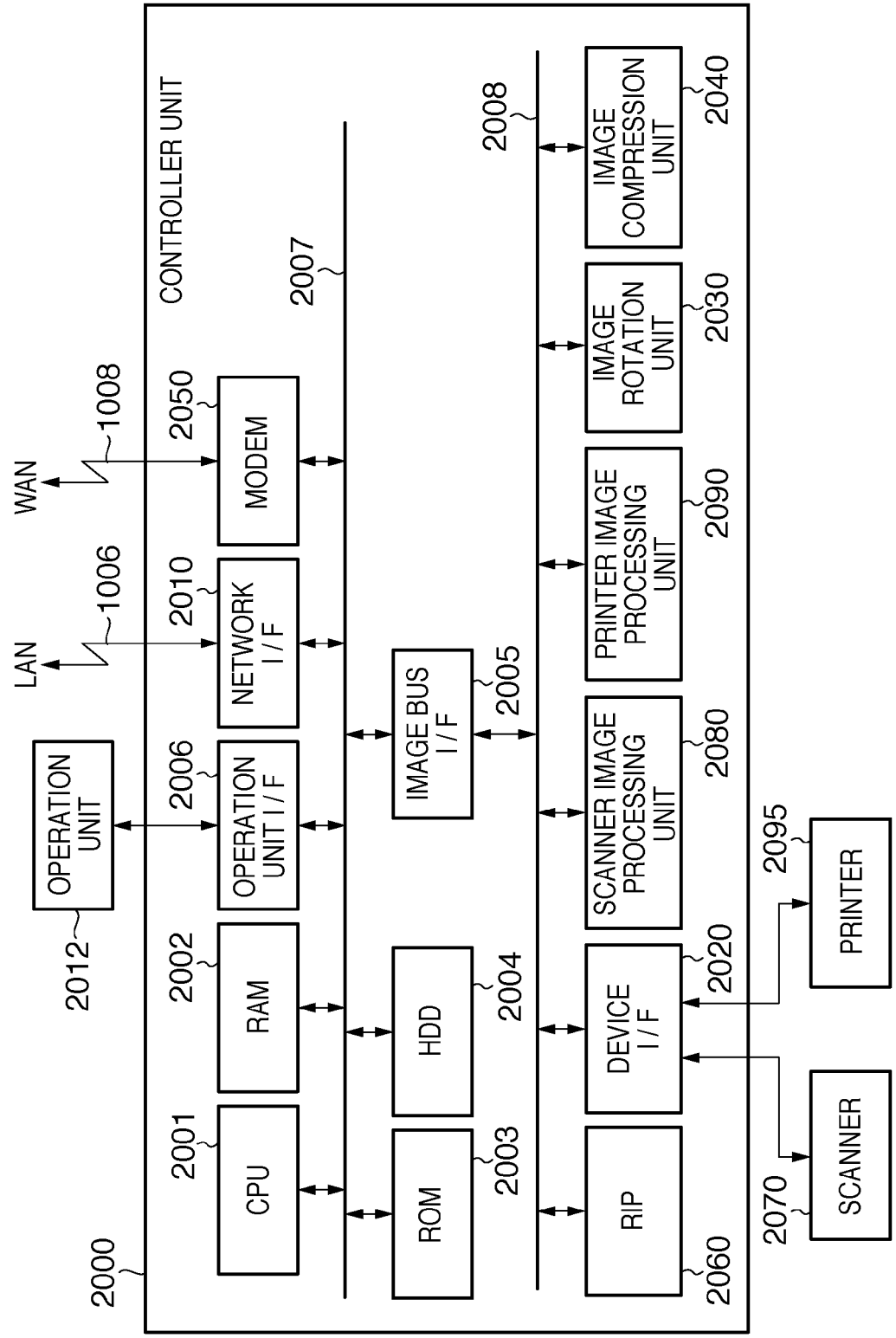
FIG. 14 is a block diagram illustrating the configuration of a primary part of a digital multifunction peripheral (MFP), which is an embodiment in which the image processing apparatus shown in FIG. 1 is implemented.

FIG. 14 is a block diagram illustrating the configuration of a primary part of a digital multifunction peripheral (MFP), which is an embodiment in which the image processing apparatus shown in FIG. 1 is implemented. In the present embodiment, a digital multifunction peripheral (MFP) with a scanner function and a printer function is used as the image processing apparatus, but a general purpose system connected to a scanner and a personal computer may be used as the image processing apparatus.

As shown in FIG. 14, the MFP is provided with a controller unit 2000 that functions as an image processing apparatus. The controller unit 2000 is connected to a scanner 2070, which is an image input device, and to a printer 2095, which is an image output device. The controller unit 2000 performs control for implementing a copy function that prints and outputs image data read from an original image by the scanner 2070 with the printer 2095. The controller unit 2000 also performs control for inputting/outputting pattern images, device information and so on to/from other apparatuses via a LAN 1006 or public line (WAN) 1008.

The controller unit 2000 includes, as shown in FIG. 14, a CPU 2001. The CPU 2001 boots an operation system (OS) with a boot program stored in a ROM 2003. Then, the CPU 2001 executes various processes by executing, on the OS, application programs stored in a HDD (hard disk drive) 2004. As a work region for the CPU 2001, a RAM 2002 is used. The RAM 2002 provides not only the work region for the CPU 2001, but also an image memory region for temporarily storing image data. The HDD 2004 stores the application programs and image data.

The CPU 2001 is connected to the ROM 2003 and the RAM 2002 via a system bus 2007. The CPU 2001 is also connected to an operation unit I/F (operation unit interface) 2006, a network I/F (network interface) 2010, a modem 2050 and an image bus I/F (image bus interface) 2005.

The operation unit I/F 2006 is an interface with an operation unit 2012 equipped with a touch panel, and outputs image data to be displayed on the operation unit 2012 to the operation unit 2012. The operation unit I/F 2006 transmits information inputted through the operation unit 2012 by the user to the CPU 2001.

The network I/F 2010 is connected to the LAN 1006, and performs input/output of information with the apparatuses connected to the LAN 1006 via the LAN 1006. The modem 2050 is connected to the public line 1008, and performs input/output of information with other apparatuses via the public line 1008.

The image bus I/F 2005 is a bus bridge for converting data structure and for connecting the system bus 2007 and an image bus 2008 that transfers image data with the system bus 2007 at a high speed. The image bus 2008 is configured of a PCI bus or IEEE1394. On the image bus 2008, a raster image processor (RIP) 2060, a device I/F 2020, a scanner image processing unit 2080, a printer image processing unit 2090, an image rotation unit 2030, a thumbnail creating unit (not shown), and an image compression unit 2040 are provided.

The RIP 2060 is a processor that expands PDL code into bitmap images. The device I/F 2020 is connected to the scanner 2070 and the printer 2095, and performs synchronous/asynchronous conversion of image data. The scanner image processing unit 2080 corrects, processes and edits inputted image data. The printer image processing unit 2090 performs printer correction, conversion of resolution, and the like for image data to be printed and outputted. The image rotation unit 2030 rotates image data. The image compression unit 2040 compresses/decompresses multi-valued image data into/from the JPEG format and binary image data into/from the JBIG, MMR, MH or another format.

Figure 2:
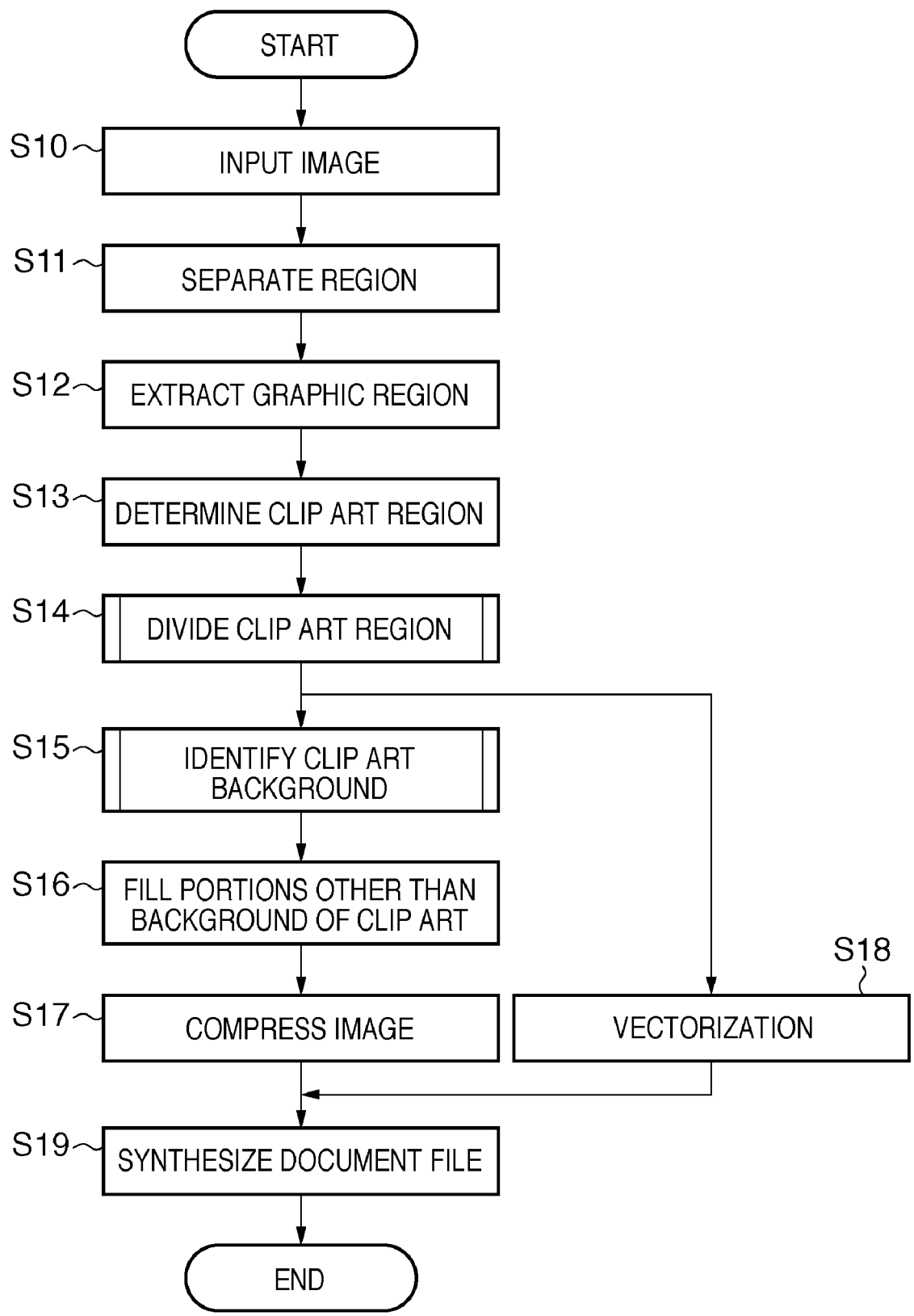
FIG. 2 is a flowchart used to illustrate an overview of the process for filling a clip art region and the process for generating a synthesized document file according to Embodiment 1 of the present invention.

Overview of Process for Filling Clip Art Region and Process for Synthesizing Document File FIG. 2 is a flowchart used to illustrate an overview of the process for filling a clip art region and the process for generating a synthesized document file according to Embodiment 1 of the present invention.

First, the input unit 10 reads a paper document using a scanner, and obtains color document image data (step S10). Next, the region separation unit 11 converts the inputted color document image into binary data, and separates the binary image data into a plurality of types of regions such as a character region, a graphic region, and a table region (step S11). As an example of implementing this region separation process, the region separation technique described in U.S. Pat. No. 5,680,478 can be used. This patent publication discloses "Method and Apparatus for Character Recognition (Shin-Ywan Wang et al./Canon K.K.)". The region separation may be performed by an operator specifying regions and their attributes. The same applies to the subsequent step of identifying a clip art region. Then, the graphic region extraction unit 12 selects regions whose attribute is "graphic" from among the regions separated in the previous step (step S12). The clip art region determination unit 13 determines whether or not each graphic region extracted in the previous step is a clip art so as to identify a clip art region (step S13). In other words, it can be said that the clip art region determination unit 13 is a clip art region identify unit. This clip art determination process can be implemented by the following process, for example.

With this process, for example, the number of colors is counted, and if the number of colors used is lower than or equal to a reference value, the region is determined as a clip art (a non-photo image such as an illustration). Specifically, the number of colors used in a graphic region is counted by, for example, sequentially focusing on each pixel in the graphic region of interest in raster order and incrementing counters for the color of each pixel. Counting the number of colors may be performed for the whole region of interest, or it may be performed as follows. When the number of colors exceeds a clip art reference value which determines whether a region of interest is a clip art (i.e., a non-photo image), the region of interest is determined as a photo image region, and the determination process on the graphic region of interest is terminated. When the number of colors is still lower than or equal to the reference value after counting the number of colors is finished for the whole graphic region of interest, the graphic region of interest is determined as a clip art (i.e., a non-photo image region).

Even a photo image may have a small number of colors when it is composed of similar colors. In order to distinguish such a photo image from non-photo images, there is a method in which, rather than simply counting colors, for example, the pixels are grouped and classified into clusters of similar color, and the number of clusters is also used as a standard for determination. In this case, the following process is performed in addition to counting the number of colors. First of all, focus is placed on the first pixel in raster scan order of image data to be processed. Then, the degree of similarity of the pixel of interest to each of the existing clusters is obtained. If there is an existing cluster having the highest degree of similarity, it is recorded that the pixel of interest belongs to that cluster. If no such similar cluster is found, a new cluster is created for the pixel of interest, and it is recorded that the pixel of interest belongs to that cluster. As used herein, "the degree of similarity" can be determined, for example, based on the distance between the color of a pixel of interest and the reference color of each cluster (the distance in a color space). Likewise, the term "cluster having the highest degree of similarity" means a cluster whose distance to the pixel of interest is lower than or equal to a reference value and is the shortest. If no such cluster whose distance to the pixel of interest is lower than or equal to a reference value is found in the existing clusters, a new cluster is generated. The term "reference color of each cluster" means the color that represents each cluster, and for example, the color of a pixel that first belonged to a cluster after that cluster is generated can be employed. The above process is executed for all of the pixels constituting an image to be processed by sequentially focusing on each pixel. If the number of colors is less than or equal to a color number reference value, and the number of clusters exceeds a cluster number reference value, the graphic region is determined as a clip art (i.e., a non-photo image), and then, the ID of the region and its attribute (attribute that defines "clip art region") are recorded, for example. Otherwise, the region of interest is determined as a photo image, and an attribute that defines "photo image" is recorded. Then, the determination process of step S13 is executed for the next graphic region. The color number reference value can be set to 64, and the cluster number reference value can be set to half of the color number reference value, for example. This is of course merely an example of clip art region determination. In step S13, finally, "clip art attribute" is written as a pixel attribute of the graphic region determined as a clip art region.

Next, the clip art region dividing unit 14 divides the pixels within the clip art region into several clusters (regions) based on the color features. The process for dividing a clip art region will be described later in detail with reference to FIG. 4 (step S14). As the output of step S14, a result of labeling is written into each pixel of the clip art region. For example, a cluster ID is written as a label into each pixel of the clip art region.

Then, the vector conversion unit 18 converts each divided clip art region into vector data based on the outline and the color of the region (step S18). Here, when a character region was separated in step S11, the character region is also vectorized. As an example of implementing the process for vectorizing a character region, for example, there is a method described in Japanese Patent No. 2885999 in which vectorization is performed by tracking the outline of a binary image and selecting the coordinate vector. This technique is used in the vectorization process of the present embodiment. The results obtained through this vectorization process are stored in a vector layer. It is, of course, necessary to store the position of the vectorized image in the document image. The vectorization is an encoding method with which the outline of an image object can be reproduced with high accuracy, so it can be said that the vector conversion unit 18 is an image data encoder.

The clip art background identify unit 15 identifies the background portion in the clip art region based on the result of the clip art region division process. The process for identifying the background of a clip art will be described later in detail with reference to FIG. 5 (step S15). In this process, for example, a cluster number corresponding to the background color is identified from among the cluster numbers associated with the pixels.

Next, the filling unit 16 for filling portions other than the background of a clip art fills the pixels corresponding to the region numbers (cluster numbers) that were not determined as the background region number (cluster number) of the clip art of the color document image, with the color (i.e., background color) of the pixels having the background region number (step S16). Here, when a character region was separated in step S11, the character region is also filled with the background color of the character region.

Next, the image compression unit 17 compresses the color document image in which the pixels corresponding to the clip art region have been filled, and stores it in a compressed data layer (step S17). As an example of the compression method, a method that employs a lossy image compressing process such as JPEG or PNG can be used. When the color document image data to be compressed includes a character region, which is to be vectorized, the character region is also filled. The image compression unit 17 and the vector conversion unit 18 constitute two types of image data encoders. Where either one is referred to as a first encoder, the other one is referred to as a second encoder.

Next, the document file synthesizing unit 19 synthesizes data of the vector layer and the data of the compressed data layer to generate multilayer output data, and outputs it to an external apparatus or stores it on a storage apparatus (step S19). That is, the document file synthesizing unit 19 generates a document file in which the vector data and the compressed data are stored. In this manner, the characters and non-photo images included in the document image are compressed through vectorization, and the photo images are lossy-compressed in a compression format such as JPEG. In the present embodiment, when the clip art region is vectorized in step S18, the vectorization process is performed on the whole rectangular clip art region, so it is likely the background portion is also converted into vector data. Accordingly, the vector data corresponding to the background portion identified by the clip art background identify unit 15 is removed and stored in the vector layer of the multilayer output data. It should be noted that the present embodiment is not limited to the configuration in which the whole clip art region is converted into vector data and the vector data corresponding to the background portion is removed. It is also possible to employ, for example, a configuration in which after the background portion of the clip art is identified, portions that were not identified as the background portion of the clip art region are determined as portions to be vectorized, and converted into vector data.

Example of Extraction of Clip Art Region

Figure 3:
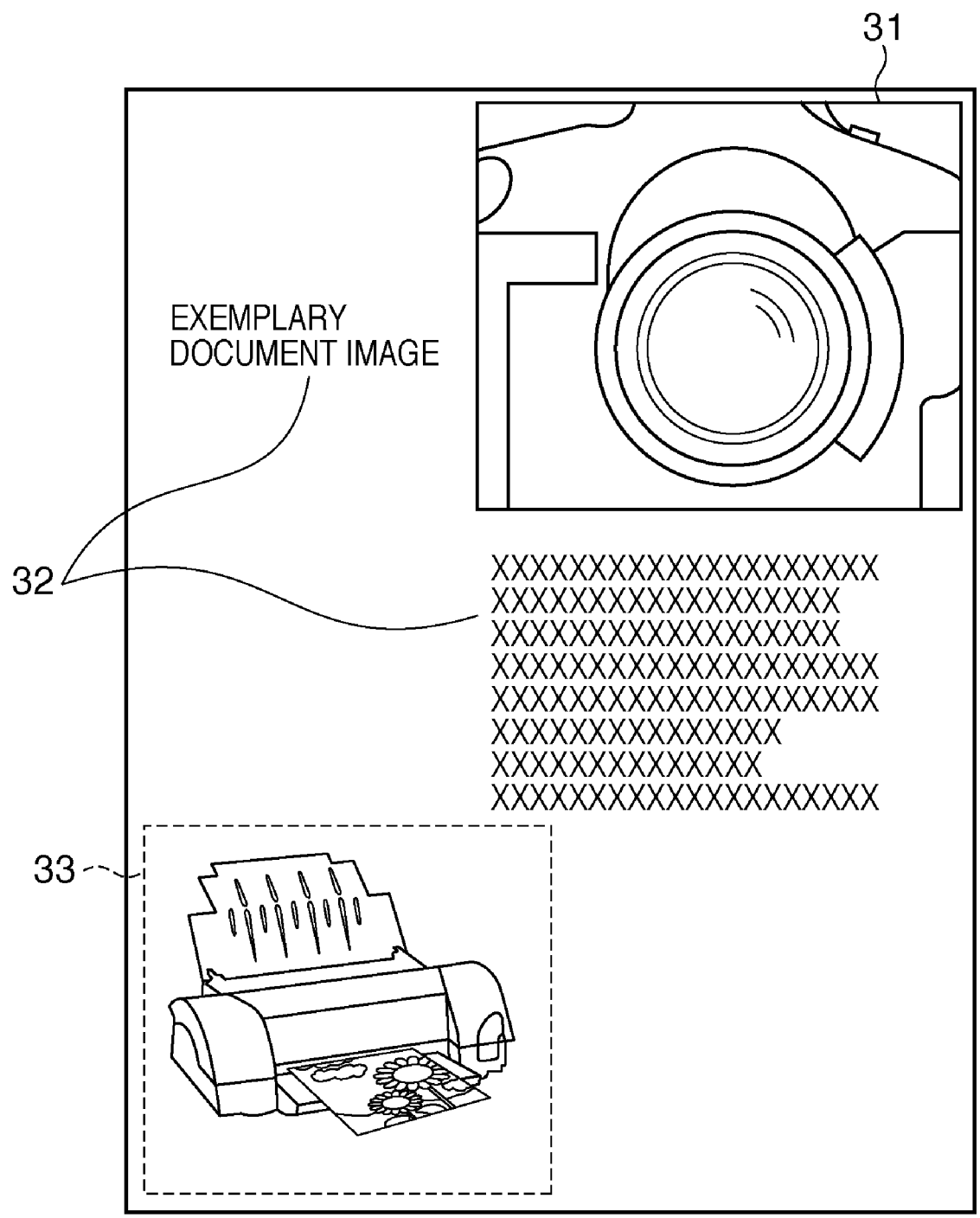
FIG. 3 is a diagram illustrating an example 1 in which a clip art region is selected from a document image in image processing according to Embodiment 1 of the present invention.

FIG. 3 is a diagram illustrating an example in which a clip art region is selected from a document image in image processing according to Embodiment 1 of the present invention. In the document image shown in FIG. 3, a photo image region 31, a character region 32 and a clip art region (non-photo image region) 33 have been separated as rectangular regions by the above-described region separation method.

Division of Clip Art Region

A process for dividing a clip art region will be described with reference to FIG. 4. First, in step S1401, a clip art image to be processed is inputted. Then, in step S1402, a clustering process is performed. In this process, first, the first cluster is generated by a start pixel obtained from a raster scan. Then, the degree of similarity of the next pixel to each of all clusters is determined. It is considered that the higher the degree of similarity, the closer the features of the pixel and the cluster.

In the present embodiment, the degree of similarity is calculated using a distance in RGB color space, but information on another color space, or information other than color information may be used as a feature amount. Then, the highest degree of similarity and the cluster number corresponding to that degree of similarity are associated with the pixel of interest and recorded, and that degree of similarity is compared to a preset threshold value. If the degree of similarity is higher than the threshold value, the pixel of interest is allowed to belong to the recorded cluster. The cluster to which each pixel belongs is associated with the pixel and recorded. If the degree of similarity is lower than the threshold value, a new cluster is generated, and the pixel of interest is allowed to belong to the new cluster. This process is repeatedly executed until all of the pixels are processed.

Next, in step S1403, a cluster integration process is performed based on the result obtained from the clustering process. In this process, first, a target value for the number of regions to be divided is inputted. This target value can be used as a rough guide for determining the number of colors to be separated. The target value may be a preset value, or may be set by the user. Then, the current number of clusters is counted. The current number of clusters is compared to the target value. If the current number of clusters is larger than the target value, cluster integration is performed. In the integration process, the degree of similarity between clusters is calculated, and two clusters having the highest degree of similarity are integrated into a single cluster. This region integration process is executed repeatedly until the current number of clusters is lower than or equal to the target value. After the clusters have been integrated, the cluster number (also referred to as a cluster identifier) recorded in association with each pixel is replaced with the cluster number of the integrated cluster.

Next, in step S1404, reprocessing of noise regions is performed based on the result obtained from the cluster integration process. In this process, labeling is first performed on the result of the region division process, and the area of each label region is calculated. Because the cluster number is recorded in each pixel, when the cluster number is used as a label, this labeling process can be omitted. The area of the region corresponding to each cluster (hereinafter also referred to as a "labeled region" or "cluster region") is the number of pixels included in that region. If the area of the cluster region is smaller than a threshold value, that region is determined as a noise region. Then, the degree of similarity of each pixel included in the noise region to the surrounding region is calculated, and the pixel is integrated with a region having the highest degree of similarity, that is, the cluster number associated with the pixel belonging to the noise region is replaced by the cluster number of the integrated region. This noise region determination process is repeatedly executed until all of the labeled regions are processed. In step S1405, the result obtained from the clip art region division process is outputted. At this time, the pixels in which the results of the above processes have already been reflected and attribute information associated with the pixels are stored, and such information is passed on to the subsequent process.

Process for Identifying Background of Clip Art

A process for identifying the background of a clip art (step S15 of FIG. 2) will be described with reference to FIG. 5.

First, in step S1501, the result of the clip art region division process (i.e., the image data of the labeled clip art region) is inputted. Then, in step S1502, the sides of the clip art image region are removed. Specifically, for example, focus is placed on the pixels constituting each side (or in other words, end portion or edge) of the rectangular clip art image region.

Then, in step S1503, statistics are taken on the frequency of appearance of each cluster (region) by referring to the cluster (region) number of each of the pixels located on the side. Then, in step S1504, a cluster (region) having the highest frequency of appearance is determined based on the frequency of appearance of each cluster (region) on the sides of the clip art image region, and identified as the background region. Because the type of illustration frequently used varies according to the type of document handled, the standard for determining whether or not a region is a background region can be determined empirically. For example, a cluster that occupies one third or more of all of the pixels located on the sides can be determined as the background region.

In the clip art region, the regions that were not identified as the background region in the above process are filled.

CLIP ART BACKGROUND IDENTIFYING PROCESS EXAMPLE 1

Figure 18:
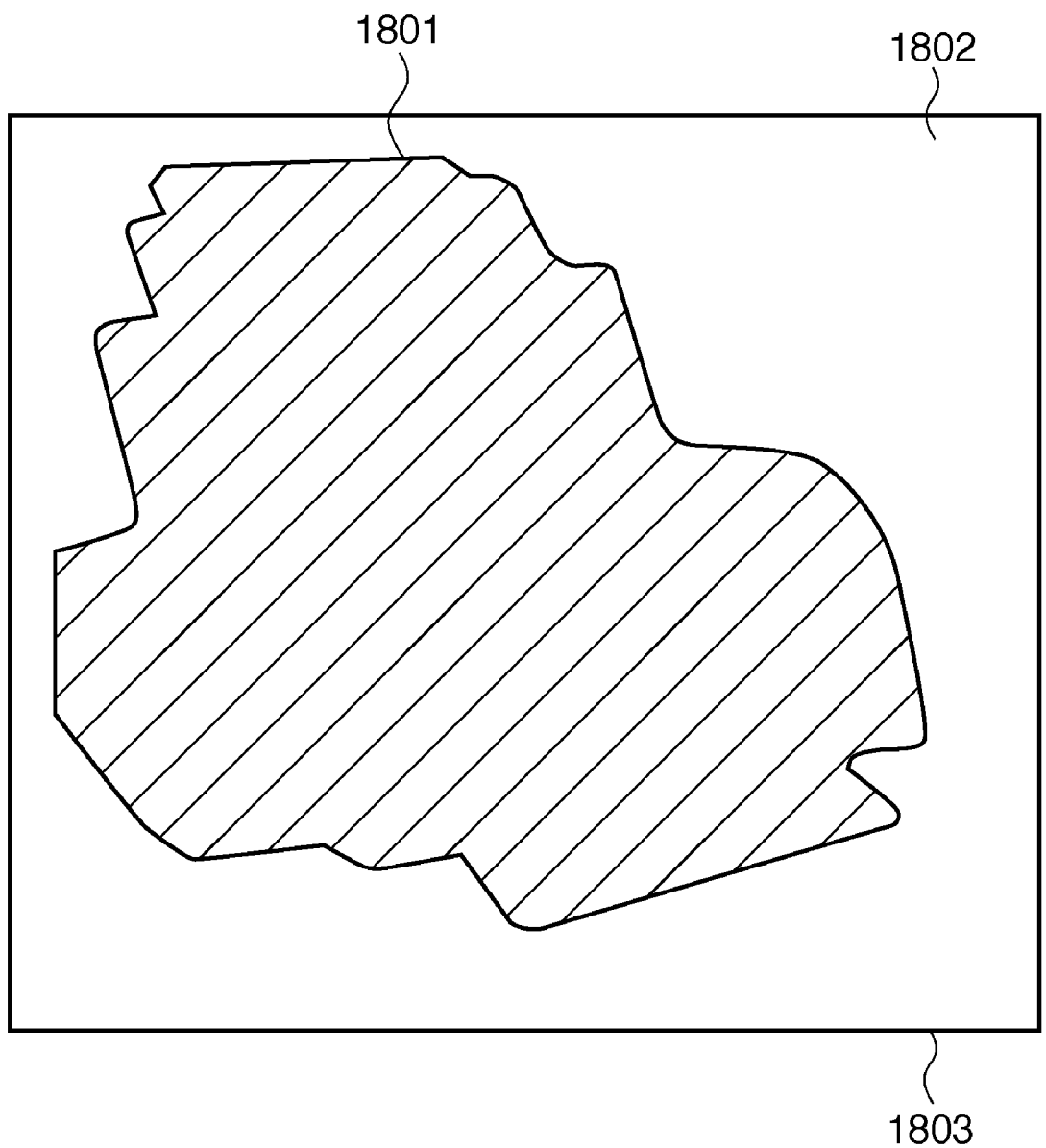
FIG. 18 is a diagram illustrating a result of a process for identifying the background of a clip art region extracted from an example of a document image in image processing of Embodiment 1 of the present invention.

FIG. 18 shows a result obtained from a process for identifying the background of a clip art region extracted from an exemplary document image 1 (FIG. 3) in the image processing of Embodiment 1 of the present invention. In FIG. 18, the clip art region has been divided into two clusters: a cluster 1801 and a cluster 1802. As a result of statistics taken for a pixel group 1803 constituting the sides of the clip art region to determine which cluster the pixel group belongs to, it was found that, in the case of FIG. 18, all of the pixels belong to the cluster 1802. Accordingly, a region corresponding to the cluster 1802 is identified as the background region based on the proportion of the cluster to which the pixel group 1803, which constitutes the four sides of the clip art rectangular region, belongs. Then, the pixels constituting a region corresponding to the cluster 1801 in the color document image are converted into vector data and stored in the vector layer, and in the color document image, a region that will serve as the background, which is to be stored in the compressed data layer, is filled with the color of the background region 1802.

CLIP ART BACKGROUND IDENTIFYING PROCESS EXAMPLE 2

Figure 19:
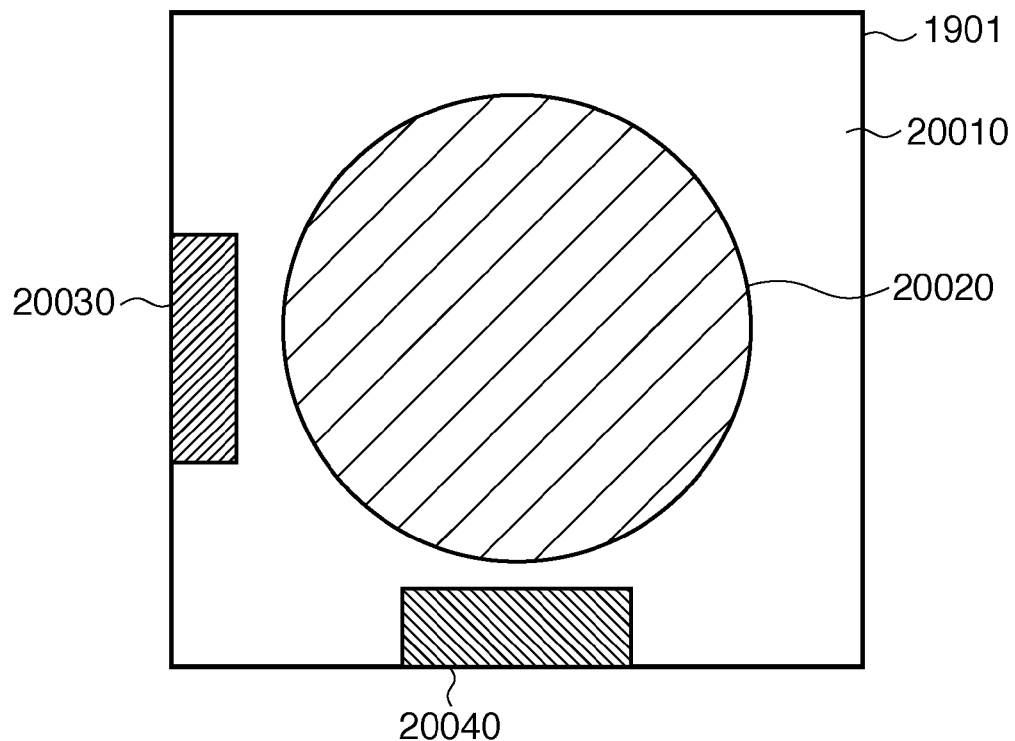
FIG. 19 is a diagram illustrating an example of a clip art region in image processing of Embodiment 1 of the present invention.
Figure 20:
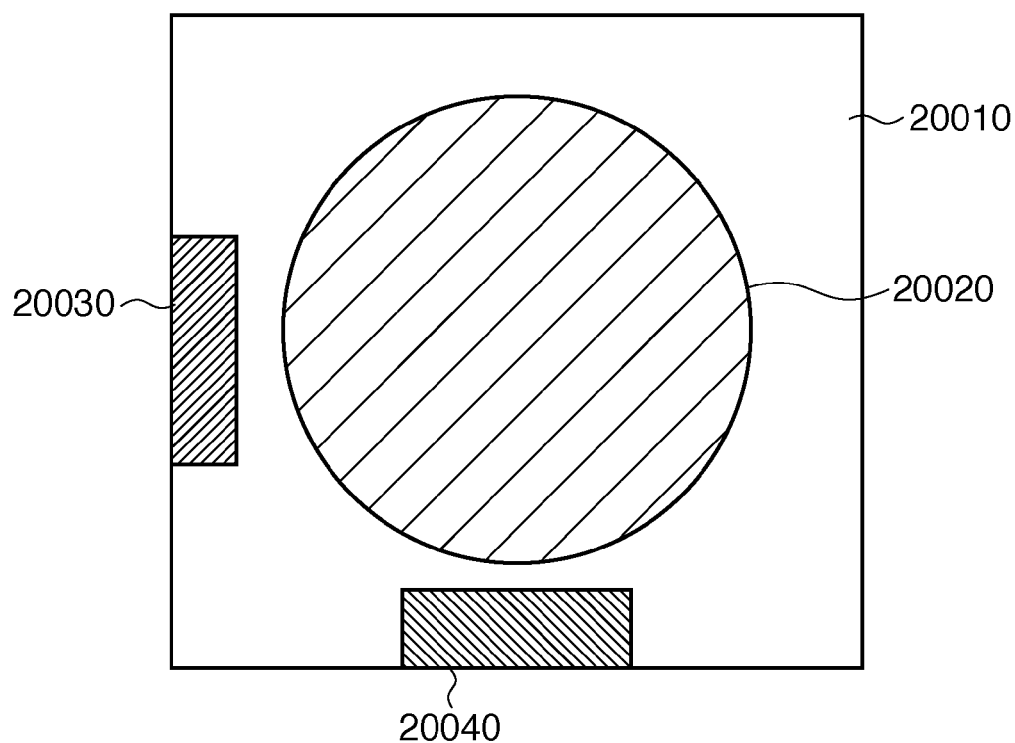
FIG. 20 is a diagram illustrating a result in which the background portion of an example of a clip art region has been identified in image processing of Embodiment 1 of the present invention.

FIG. 19 is an example 2 of a clip art region in the image processing of Embodiment 1 of the present invention. This clip art image is divided into four regions by a region division process: a green cluster 20010, a yellow cluster 20020, a blue cluster 20030 and a purple cluster 20040. In this background identifying process, the frequency of appearance in cluster information (namely, cluster number) of a pixel group 1901 constituting the four sides of the rectangular region constituting the clip art image is counted. As a result, the number of pixels belonging to the green cluster 20010 is the largest, that is, the frequency of appearance of the green cluster is a predetermined proportion or more, so the green cluster is identified as the background region. FIG. 20 shows a result of the process for identifying the background of a clip art region (FIG. 19) in the image processing of Embodiment 1 of the present invention. Gray regions (20020, 20030 and 20040) of FIG. 20 are converted into vector data, and these regions will be filled in the filling process. The region other than these regions (green cluster 20010) is a region identified as the background region, so it will not be filled.

CLIP ART REGION FILLING PROCESS EXAMPLE 1

Figure 6:
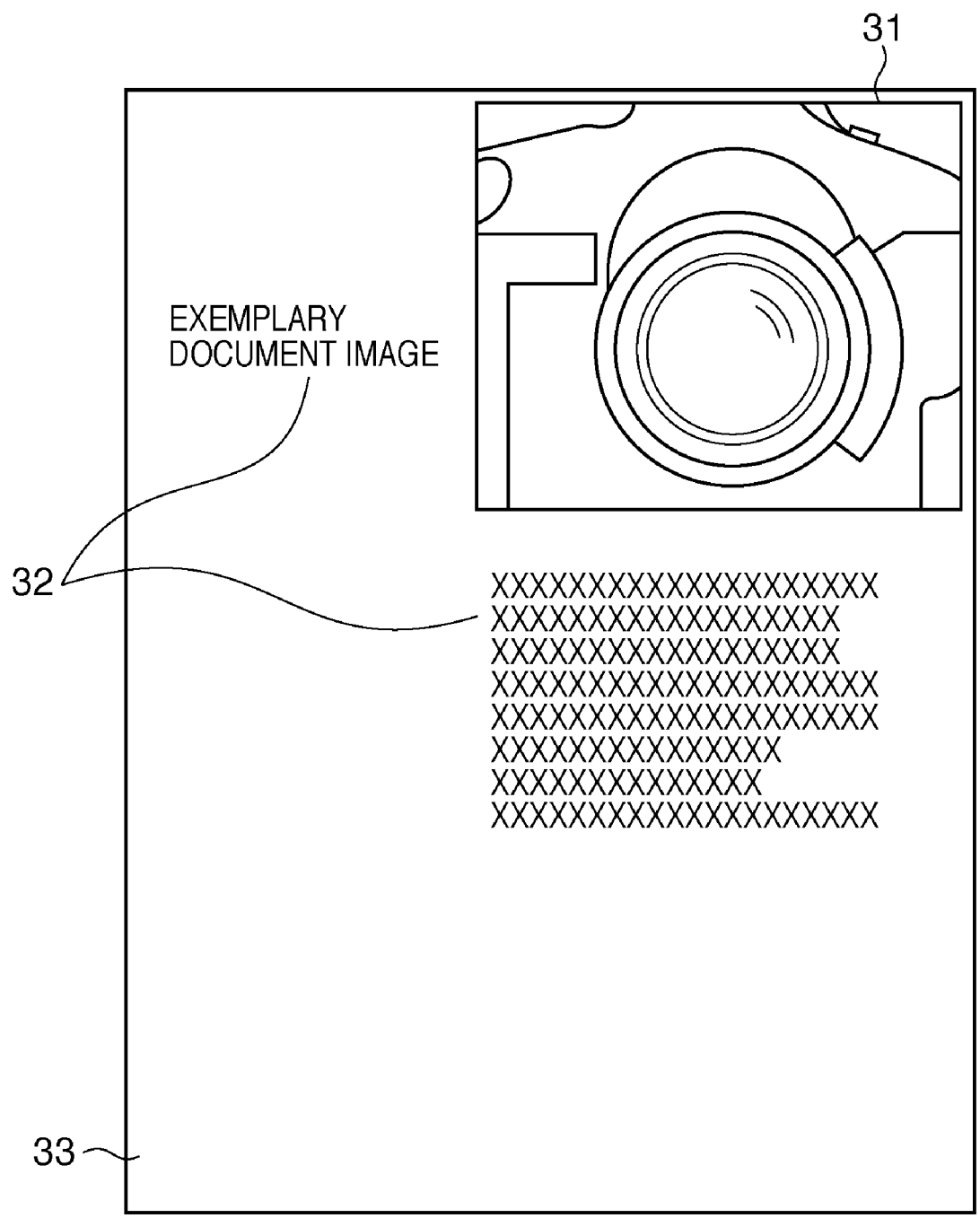
FIG. 6 is a diagram illustrating a result of a clip art region filling process performed on an example of a document image in image processing of Embodiment 1 of the present invention.

FIG. 6 is a diagram illustrating a result of a clip art region filling process performed on the exemplary document image (FIG. 3) in image processing of Embodiment 1 of the present invention. The clip art region 33 of FIG. 3 is subjected to the clip art region division process of FIG. 4, and the pixels of the region are classified into clusters of different colors. In FIG. 4, because a picture of a printer is drawn on the background, the pixels are divided into several clusters of colors that constitute the background and the picture of the printer. Then, statistics are taken on the clusters to which the pixels, which constitute the sides of the clip art region, belong according to the process of FIG. 5, and a cluster having the highest frequency of appearance in the sides of the region is identified as the background cluster. Subsequently, in the background image (color image) to be stored in the compressed data layer (background layer), the pixels belonging to the clusters that were not identified as the background cluster are replaced by the background color (i.e., filled with the background color). Although characters are shown remaining in FIG. 6 to simplify the description by focusing only on the clip art region, it is desirable that the character region is separately vectorized and filled with its background color.

CLIP ART REGION FILLING PROCESS EXAMPLE 2

Figure 22:
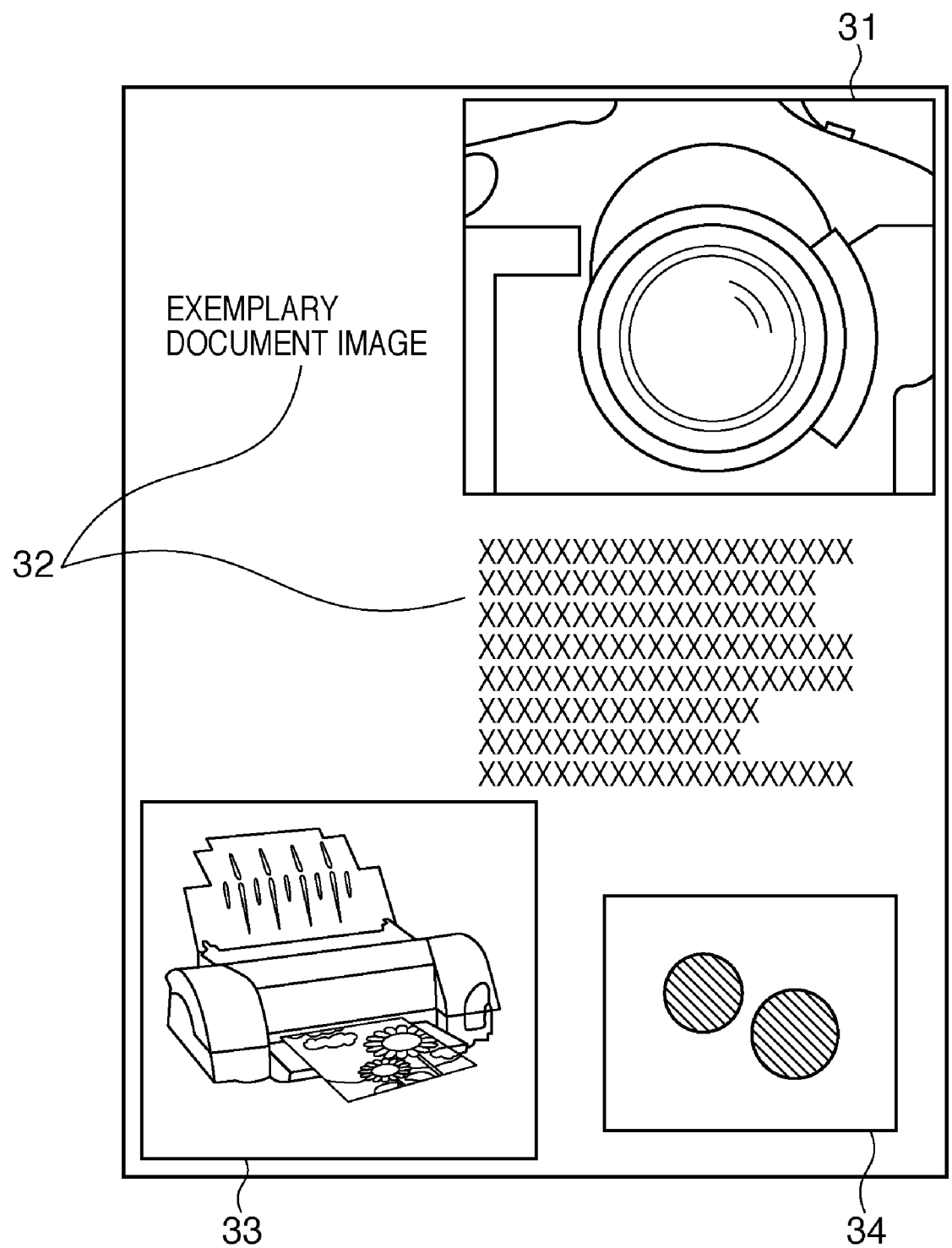
FIG. 22 is a diagram illustrating an example in which a clip art region is selected from a document image.
Figure 23:
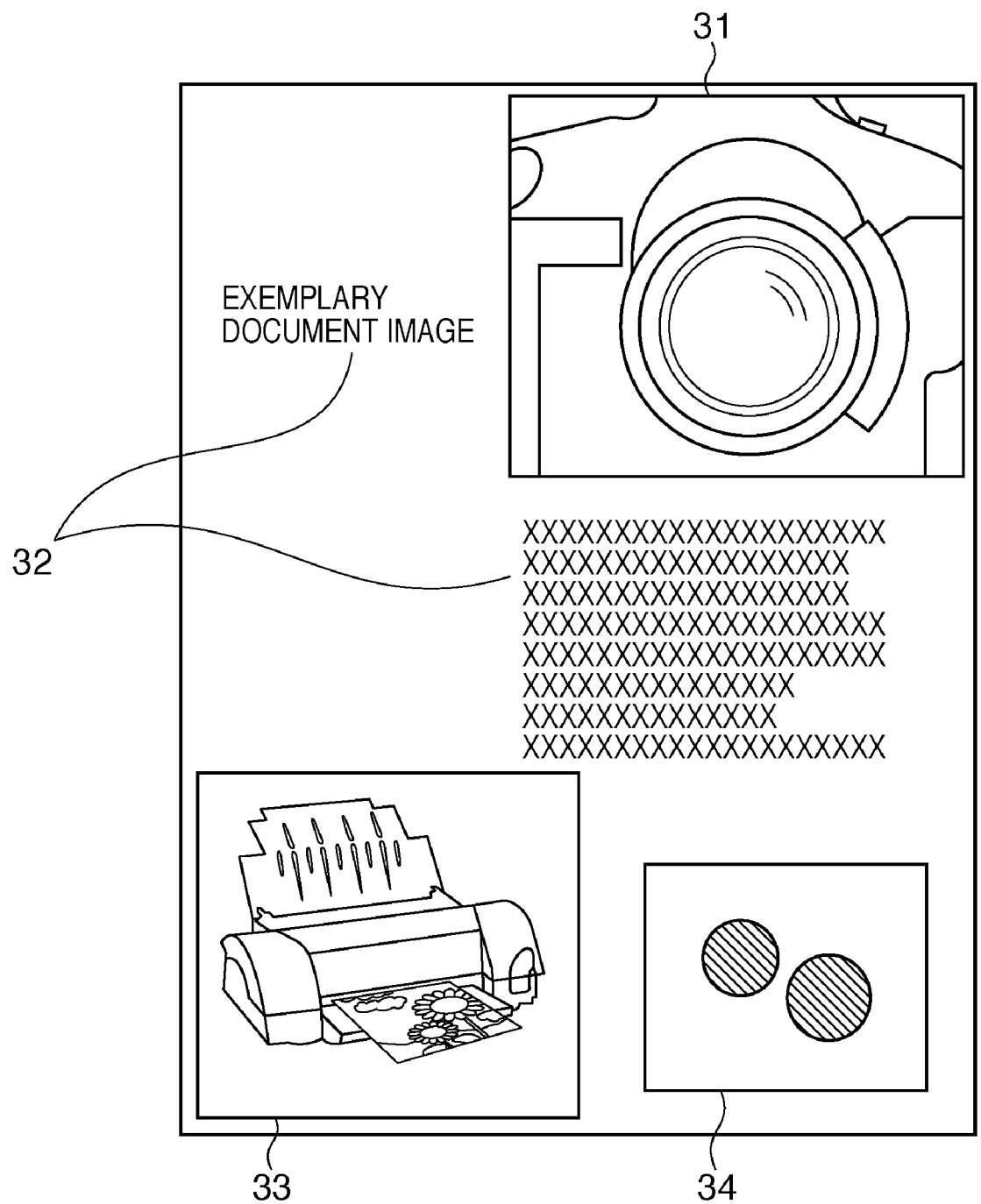
FIG. 23 is a diagram illustrating a result of a vectorization process performed on a whole clip art region.
Figure 24:
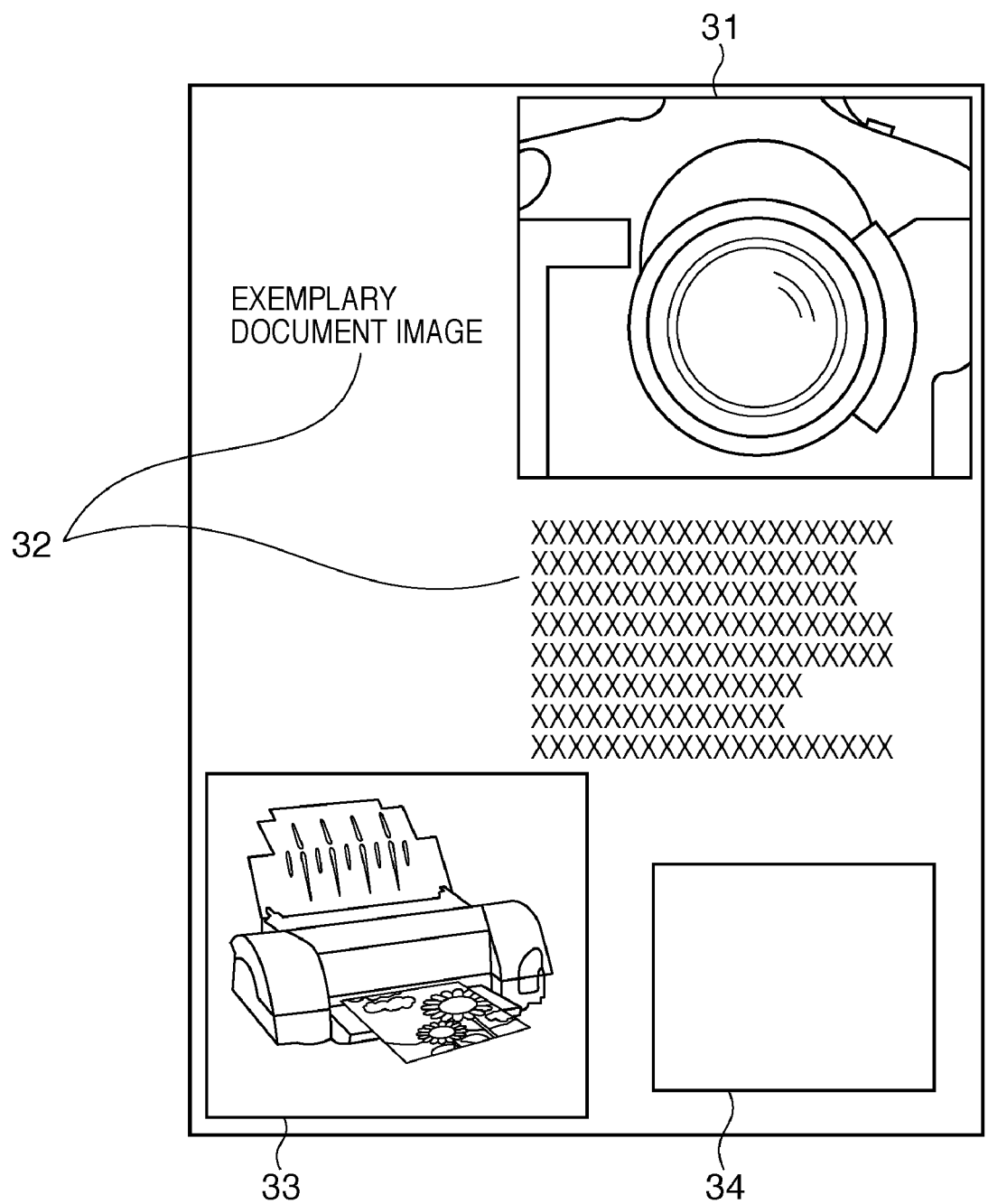
FIG. 24 is a diagram illustrating a result in which an illustration portion has been filled in a clip art region.

FIG. 22 is a diagram showing an example 2 in which a clip art region is selected from a document image in the image processing of Embodiment 1 of the present invention. A document image shown in FIG. 22 includes a graphic region (clip art region) 34 whose background portion has subtle color gradation. It is assumed here that the graphic region, when clustered in colors, is divided into clusters corresponding to illustration portions (two circular regions located in the center) and a cluster corresponding to a color gradation portion. In this case, because the cluster portion corresponding to the color gradation portion accounts for a large proportion of the sides of the graphic region, it is identified as the background region. The clusters corresponding to the illustration portions are converted into vector data, whereas the cluster portion corresponding to the background region is not converted into vector data. Then, in the color document image (background image) serving as the background, a filling process is performed on the illustration portions which have been converted into vector data, but not on the cluster portion constituting the background region, so the original color gradation image remains. FIG. 24 is a diagram showing a result of the process for filling a clip art region performed on the exemplary document image 2 (FIG. 22) serving as the background image. Because the portions that were not identified as the background of the clip art image are filled, and the background portion is not filled, the color gradation portion of the background remains as original. If the whole graphic region 34 is converted into vector data without performing this process of the present embodiment, the cluster corresponding to the background portion is also converted into vector data of a single color, eliminating the color gradation portion of the background as shown in FIG. 23.

As described above, according to Embodiment 1, a clip art region separated from a document image is clustered, and the background cluster and illustration clusters are identified. In such a color document image, only the portions corresponding to clusters that are not identified as the background are filled with the background color, and the image data obtained as a result of the filling process is compressed in the JPEG format and stored in a compressed data layer. The cluster portions other than the background (illustration portions) of the clip art region are converted into vector data, and then stored in a vector layer together with the vector data of characters and the like. When this document file including a compressed data layer and a vector layer is reproduced, the vector data of the vector layer is expanded on the image obtained by expanding the JPEG data of the compressed data layer.

With the vectorization of a clip art, it becomes possible to achieve higher editing performance, higher image quality and higher compression of the vector layer of the document image. In addition, with the process for filling a clip art, and the compression of the filled clip art image, it becomes possible to achieve even higher compression of the compressed data layer of the document image. Furthermore, even when the background portion of the clip art has subtle color gradation, the background portion will not be filled or converted into vector data of a single color, so the original subtle color gradation can be reproduced in the document file.

Embodiment 2

A process for identifying the background region and filling the same performed when a clip art region partially overlaps another region such as a photo will be described as Embodiment 2.

Figure 15:
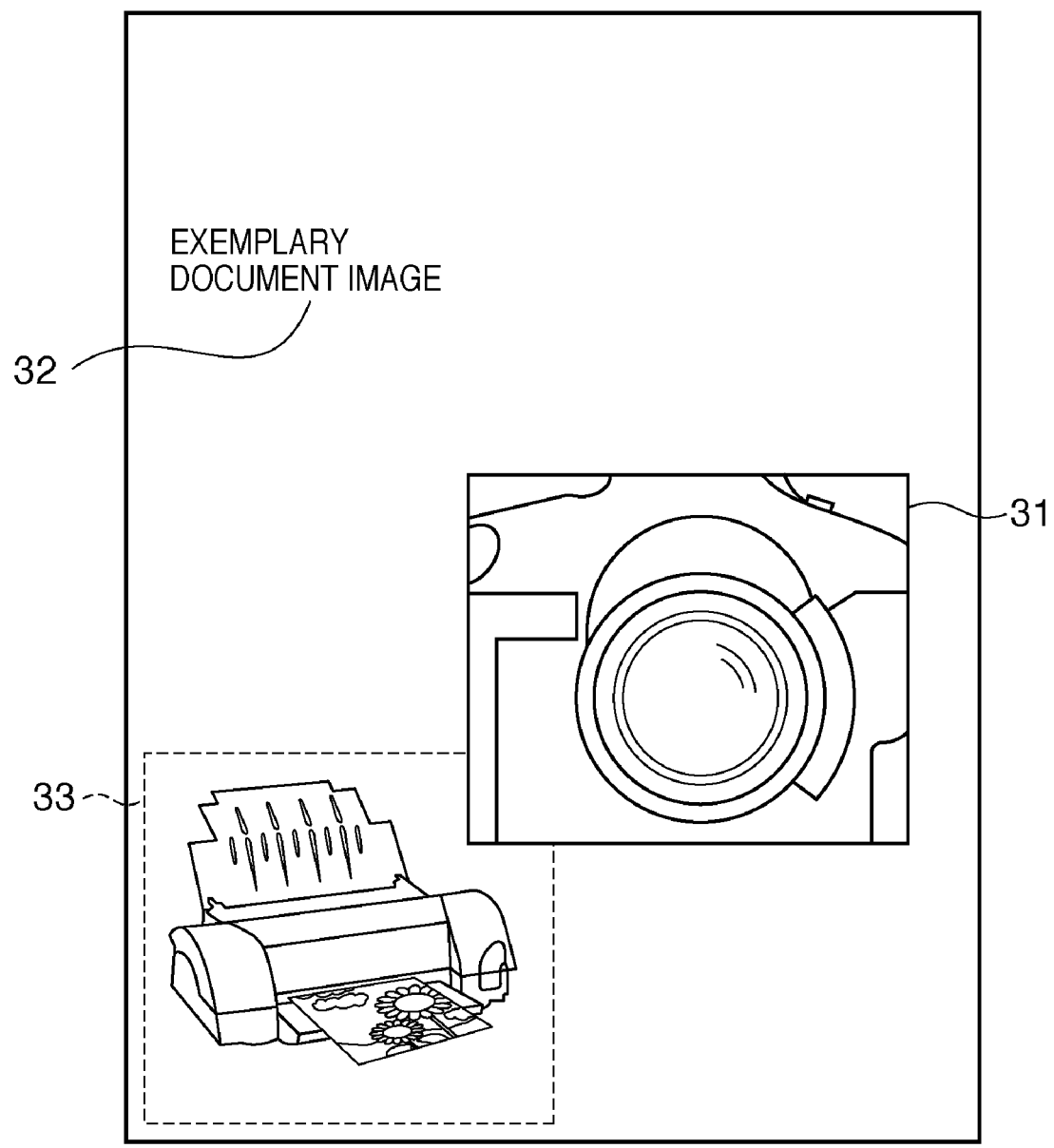
FIG. 15 is a diagram illustrating an example in which a clip art region is selected from a document image according to Embodiment 2 of the present invention.
Figure 16:
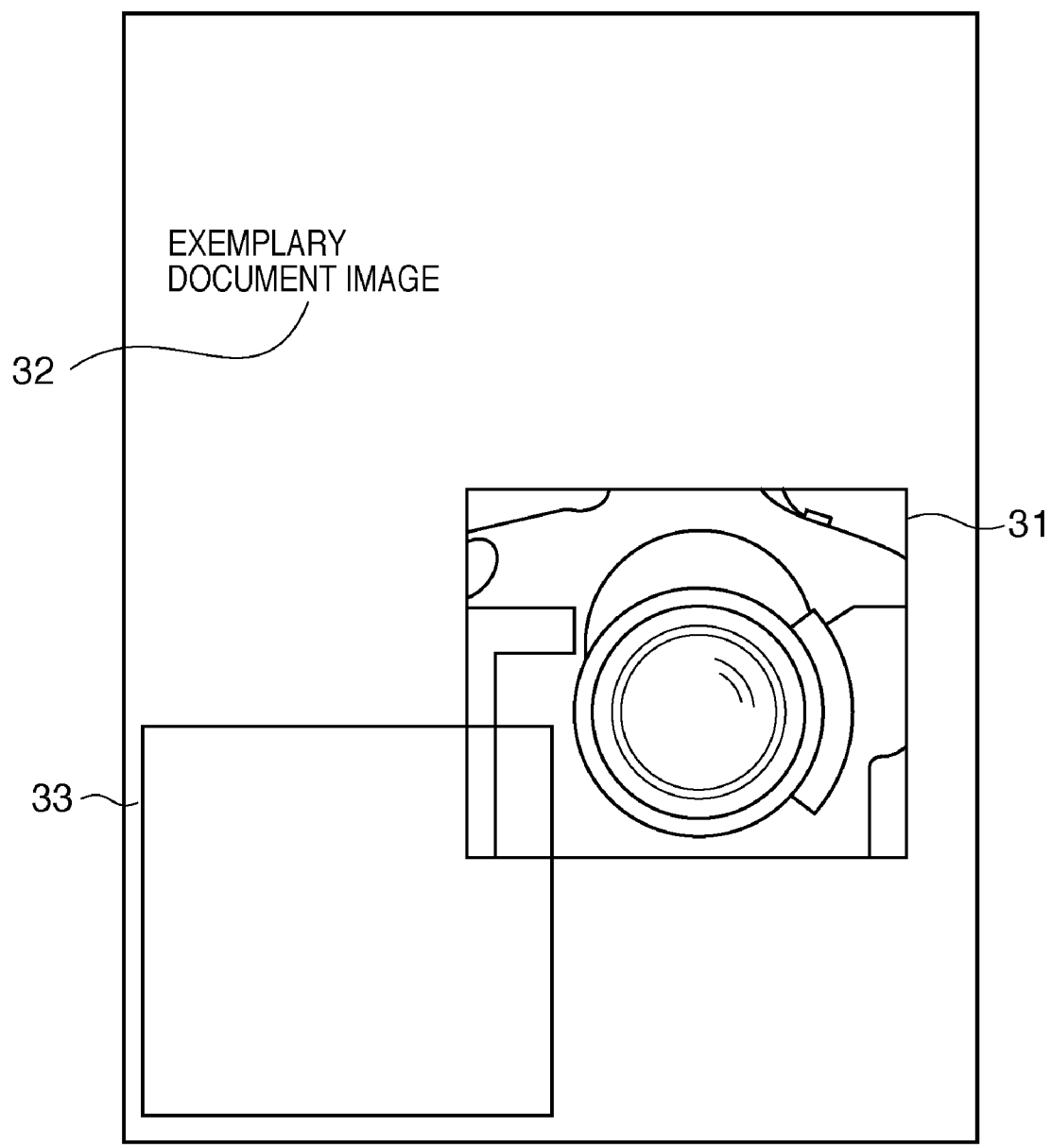
FIG. 16 is a diagram illustrating a result of a clip art region filling process performed on an example of a document image in image processing of Embodiment 2 of the present invention.
Figure 17:
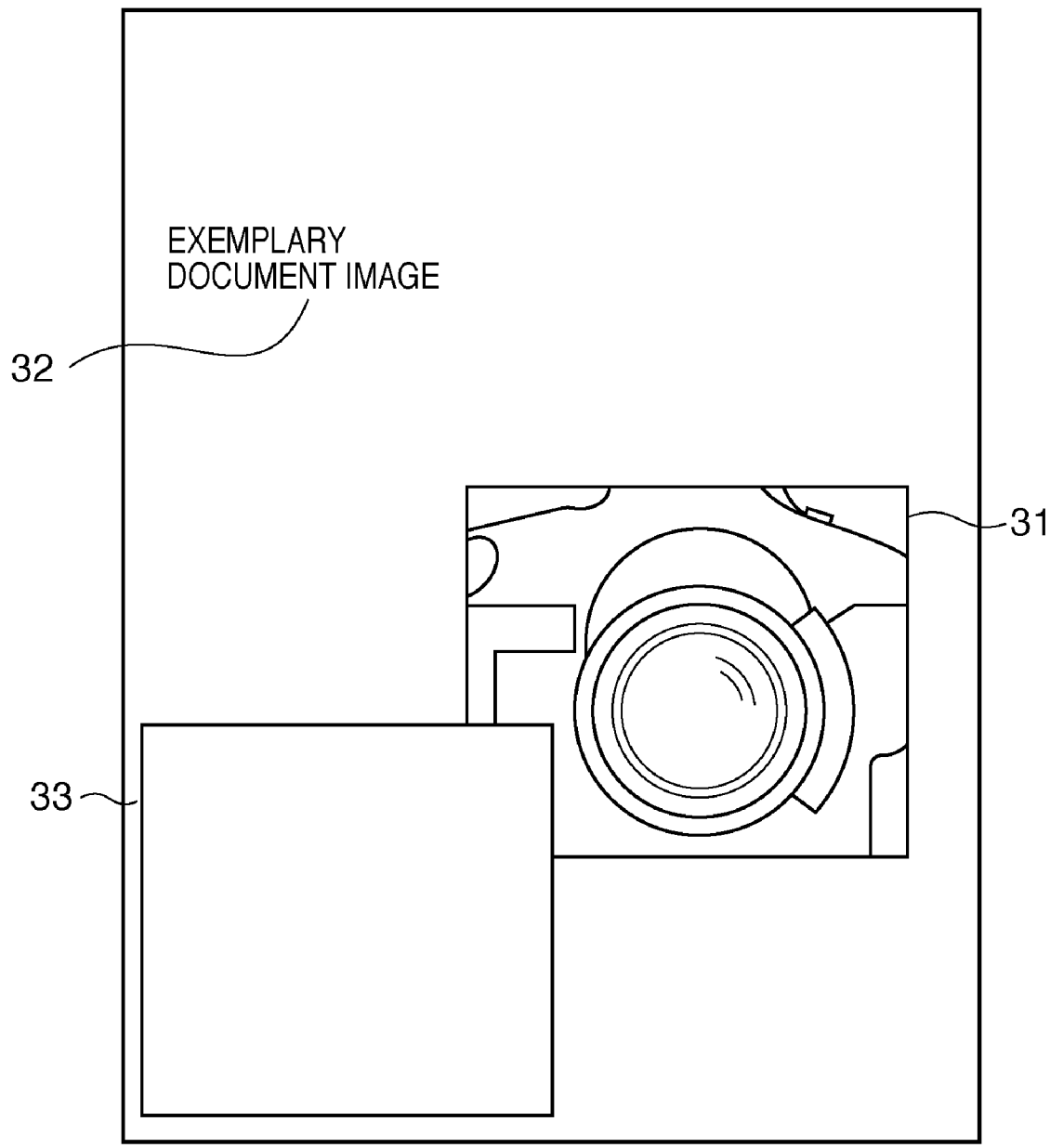
FIG. 17 is a diagram illustrating a result in which a whole clip art region has been filled.

FIG. 15 is a diagram illustrating an example in which a clip art region is selected from a document image. In the document image shown in FIG. 15, a photo image region 31 is overlapping a clip art region 33. If the filling process is performed on the whole clip art region, part of the photo image region overlapping the clip art region is filled as shown in FIG. 17. To address this, in the present embodiment, after the clip art region is clustered in colors, a cluster corresponding to the background region is identified in the same manner as in Embodiment 1, and then a determination is made as to whether or not a photo image region is overlapping. If it is determined that a photo image region is overlapping, a cluster corresponding to the position of the overlapping portion is also identified as a cluster of the background region. FIG. 16 is a diagram showing a result of the process for filling a clip art region performed on the exemplary document image of FIG. 15 in the image processing of the present embodiment. Because the filling process is not performed on the cluster corresponding to the overlapping portion where the photo image region overlaps, the original photo image region 31 remains.

As described above, because the clip art region except for the illustration portion is identified as the background region, and the filling process is performed with high accuracy, the accuracy of reproducibility of the original image when the generated document file is reproduced increases.

Embodiment 3

Embodiment 1 utilized the cluster information of the pixels located on the sides of a clip art region to identify the background of the clip art, whereas Embodiment 3 focuses on the pixels located in a partial region (near a corner, near the center of a side) of a clip art region, utilizes the cluster information of these pixels, and identifies a cluster having the highest frequency as the background cluster.

In the present embodiment, in order to identify the background region, in a clip art (non-photo image) region, sample regions are defined to include a side (end portion) of the non-photo image region, and a cluster to which a largest number of pixels of the sample regions belong is identified as the background region.

CLIP ART BACKGROUND IDENTIFYING PROCESS EXAMPLE 1

Figure 21:
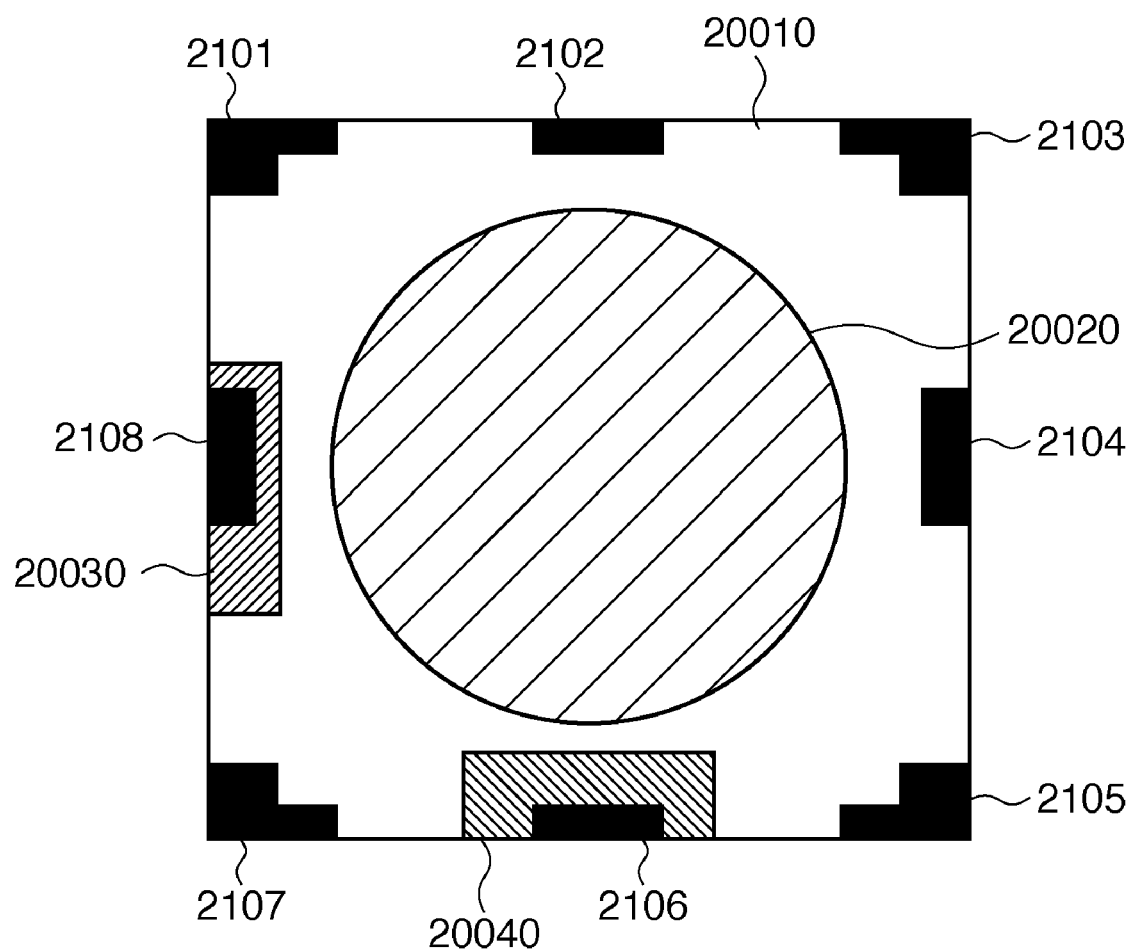
FIG. 21 is a diagram illustrating an example showing how peripheral regions of interest are set in a process for identifying the background of an example of a clip art region in image processing of Embodiment 3 of the present invention.

FIG. 19 shows an example of a clip art region. It is assumed here that this clip art image has been divided into four regions through a region division process: a green cluster 20010, a yellow cluster 20020, a blue cluster 20030 and a purple cluster 20040. FIG. 21 shows sample regions 2101 to 2108 (black portions) used in this process for identifying the background of the clip art region (FIG. 19) in the image processing of the present embodiment. The sample regions are each defined near a corner of the clip art region, or near a side of the same. In this background identifying process, focus is placed on the pixels included in the sample regions, the number of pixels belonging to each cluster is determined, and a cluster having the highest frequency of appearance is determined as a cluster constituting the background. In FIG. 21, the number of pixels belonging to the green cluster 20010 is the largest, that is, the green cluster has the highest frequency of appearance, so the green cluster is identified as the background region.

In the present embodiment, the sample regions are defined as black portions having shapes as shown in FIG. 21, but the present embodiment is not limited thereto. For example, the position of the sample regions may be changed according to the clip art region processed.

Embodiment 4

Clip art regions often incorporate images whose background portion has a pale color. Such images can be processed as in Embodiment 1, but by using the characteristic that the background has a pale color, it is possible to identify the background portion in a clip art filling process. In a process for identifying the background of a clip art according to Embodiment 4, the background is identified based on the saturation information of each cluster. Specifically, in the present embodiment, a cluster that has a color with saturation smaller than preset reference saturation and has a larger number of pixels than a preset reference number of pixels is identified as the background region.

The configuration block diagram and flowcharts of an image processing apparatus having a function for performing a process for filling a clip art region and a process for synthesizing a document file according to Embodiment 4 are the same as those of Embodiment 1, except for the clip art background identifying process (FIG. 5). The clip art background identifying process of the present embodiment is performed as illustrated in FIG. 7.

Figure 7:
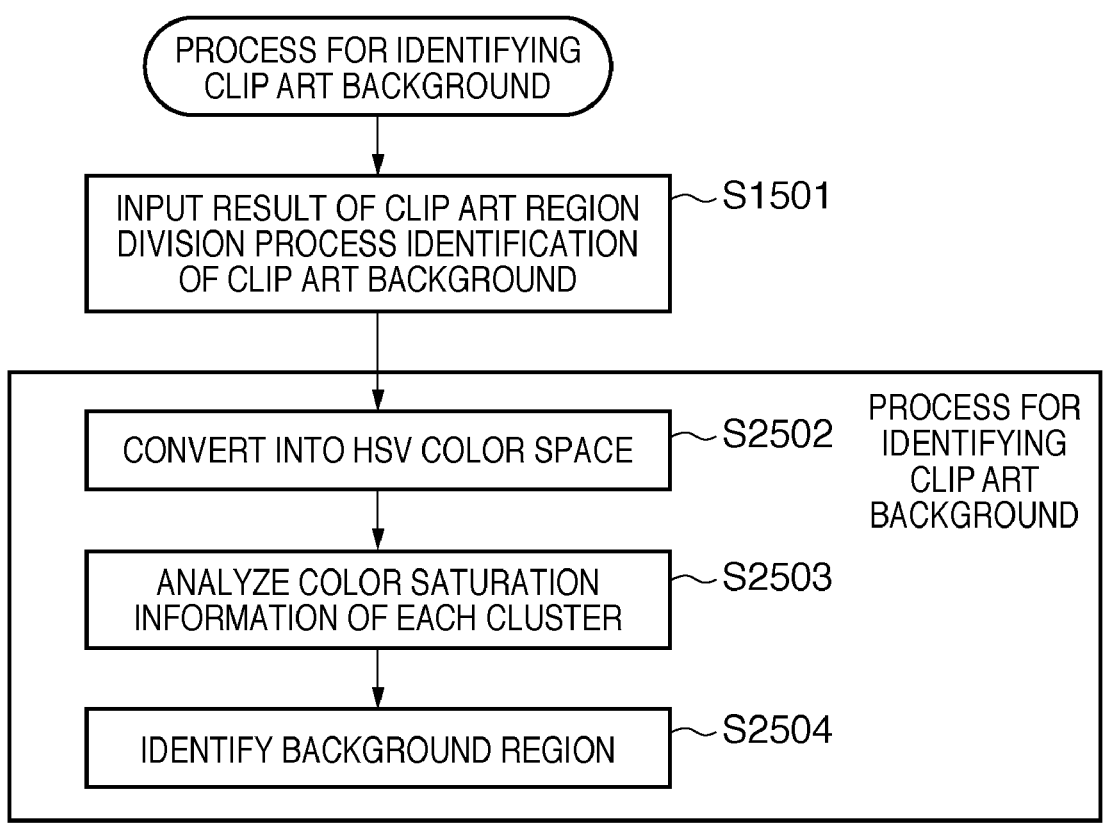
FIG. 7 is a flowchart used to illustrate an overview of a process for identifying the background of a clip art according to Embodiment 4 of the present invention.

FIG. 7 is a flowchart used to illustrate an overview of a process for identifying the background of a clip art according to Embodiment 4. First, in step S1501, the result obtained from the clip art region division process is inputted. Then, in step S2502, the color information of each cluster is obtained from RGB information as saturation information S. As a means for obtaining saturation information, there is a method in which conversion is performed from RGB color space into HSV color space, but other techniques for obtaining saturation information may be used. In step S2503, the saturation information of the reference color of each cluster is analyzed. In this step, for example, the saturation of the reference color of each cluster is compared to a saturation threshold value to determine whether it is larger or smaller than the threshold value. Regardless of a clip art with an illustration or a clip art with scan noise, an image whose background portion has a pale color has a very low saturation S. By using this characteristic, in step S2504, the background region is identified. If there is a cluster whose saturation S is lower than a saturation threshold value (e.g., 10) and whose size is larger than a size threshold value, this cluster is determined as the background region. Other processes are the same as those of Embodiment 1. According to the present embodiment, the background can be identified with a simpler process.

Embodiment 5

In the present embodiment, when there are multiple clusters with a frequency of appearance within a preset range of error, the background region is determined by further performing the process of Embodiment 4 in which the background region is determined using the saturation information of the clip art. Here, a region whose saturation is low is determined as the background region.

Specifically, in the clusters of a clip art region, when each cluster is compared to the cluster with the largest number of pixels, and another cluster with a difference in number of pixels that is less than or equal to a reference value is found, the background color is determined with reference to color saturation. In such a case, for example, a cluster having the lowest color saturation among the clusters (i.e., clusters including the cluster having the largest number of pixels and the other cluster) is identified as the background region.

Embodiment 6

In the present embodiment, the perimeter of a cluster identified as the background from a non-photo image region is expanded by an amount corresponding to a preset width, and the expanded portion is included in the background region, and the background is identified. The reason for this is stated below. It is often the case that blurring or much noise occurs in a clip art region (the border line portion in particular) of a document image due to scanning. In such a case, because the pixels located on the border line are not necessarily classified into the same cluster (region) by the region division process, when the portions that were not identified as the background are filled after the background was identified, the pixels that do not belong to the background region will not be filled. The original color of such pixels is close to the color of the background region, and as such, even if such pixels are not filled, they will not stand out so much in the final result obtained as a result of the clip art filling process. However, by removing such blurring and noise, compression ratio can be improved, and the appearance of the resultant can also be improved. Accordingly, in Embodiment 6, the regions that were not identified as the background in the background identifying process are expanded to a range of several pixels (two pixels in the present embodiment) away from the region, and then filled.

Configuration of Apparatus

Figure 8:
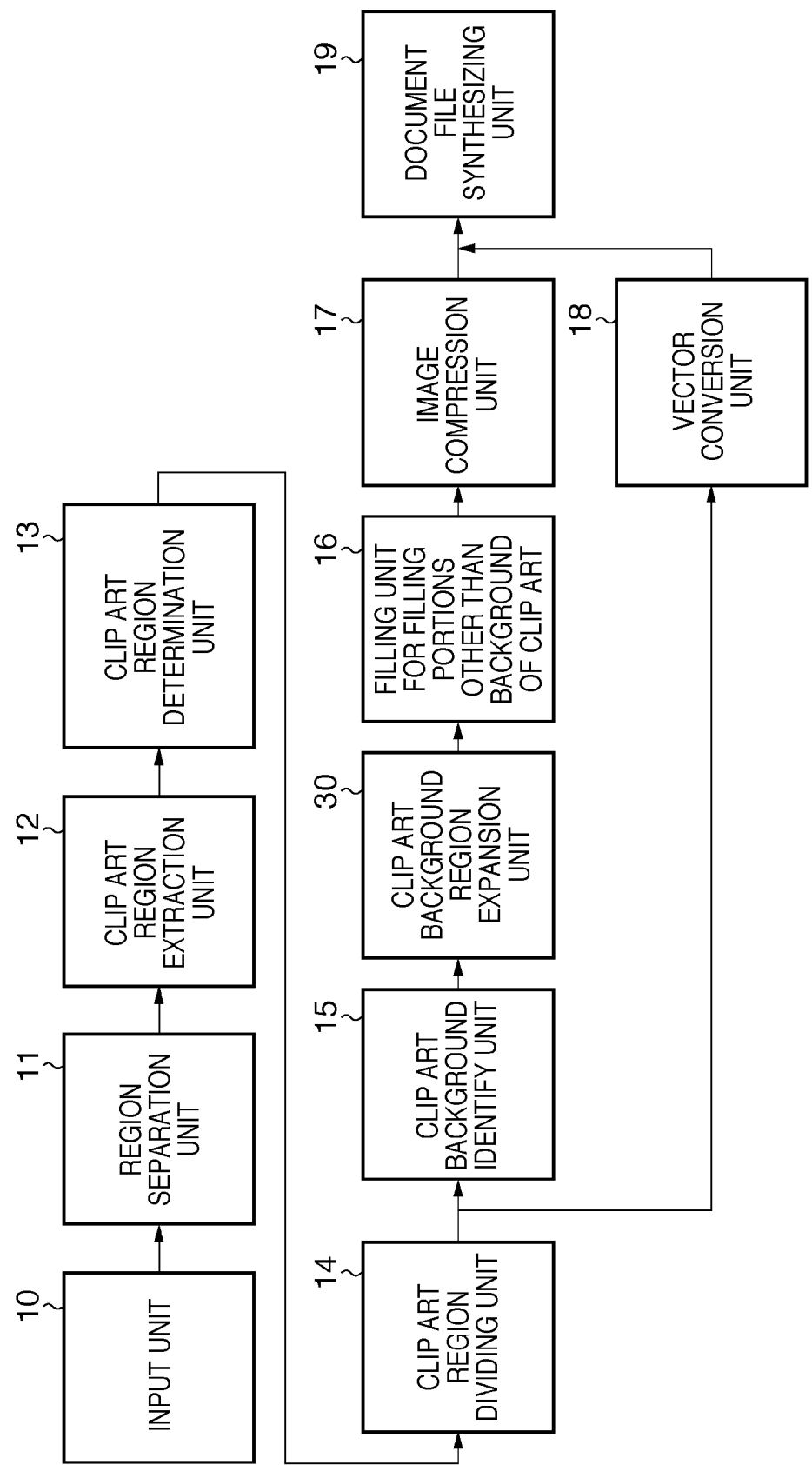
FIG. 8 is a block diagram illustrating the configuration of an image processing apparatus having a function for performing a process for filling a clip art region and a process for generating a synthesized document file according to Embodiment 6 of the present invention.

FIG. 8 is a block diagram illustrating the configuration of an image processing apparatus having a function for performing a process for filling a clip art region and a process for generating a synthesized document file according to Embodiment 6 of the present invention. In FIG. 8, an input unit 10 is a unit that inputs a document image, and a region separation unit 11 is a unit that separates the document image into a character region, a photo region and so on. A graphic region extraction unit 12 is a unit that extracts graphic regions whose attribute is "graphic" from among the result obtained from the region separation process, and a clip art region determination unit 13 is a unit that determines a clip art region from among the graphic regions. A region dividing unit 14 is a unit that divides the clip art region based on the color features of the pixels of the clip art image, and a background identify unit 15 is a unit that identifies the background portion of the clip art region based on the result obtained from the region division process. An expansion unit 30 for expanding portions other than the background of a clip art is a unit that expands the regions that were not identified as the background in the background identifying process to a perimeter several pixels away from that region, and a filling unit 16 for filling portions other than the background of a clip art is a unit that fills the portions that were not identified as the background with the background color. An image compression unit 17 is a unit that compresses the result obtained from the clip art portion filling process, and a vector conversion unit 18 is a unit that converts the result obtained from the clip art region division process into vector data. A document file synthesizing unit 19 is a unit that synthesizes the data of the compressed data layer and the data of the vector layer into a multilayer file, and outputs the file. In other words, in the image processing apparatus of Embodiment 6, the expansion unit 30 for expanding portions other than the background of a clip art has been added to the apparatus of Embodiment 1.

Figure 9:
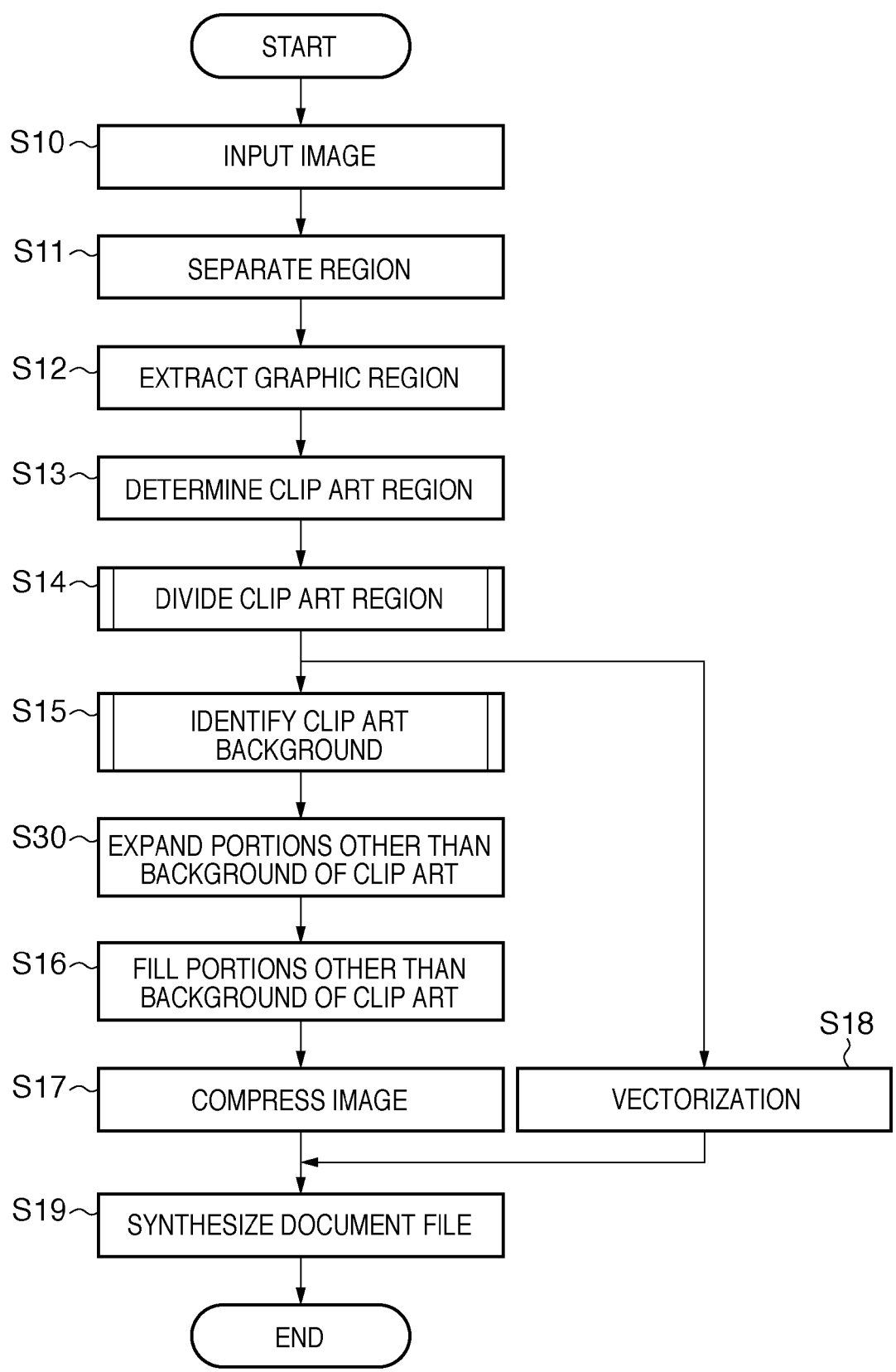
FIG. 9 is a flowchart used to illustrate an overview of the process for filling a clip art region and the process for generating a synthesized document file according to Embodiment 6 of the present invention.

Overview of Process for Filling Clip Art Region and Process for Synthesizing Document File FIG. 9 is a flowchart used to illustrate an overview of a process for filling a clip art region and a process for synthesizing a document file according to Embodiment 6. In FIG. 9, step S30 has been inserted between steps S15 and S16 of the process of FIG. 2. Accordingly, only the process of step S30 will be described, and other descriptions are omitted here.

In step S30, the expansion unit 30 for expanding portions other than the background of a clip art expands the regions that were not identified as the background region in step S15. Specifically, in the contact portion where the background region identified in the background identifying process and a region that was not identified as the background contact each other, over a fixed width, the cluster number associated with the pixels of the background region is overwritten with the cluster number of the region that was not identified as the background. The cluster number can be, if not used in subsequent processes, any number as long as it is a cluster number other than the cluster number of the background region. In the case where the background has been identified by setting pixel's "background" attribute, by removing the background attribute of the pertinent regions, the regions that were not identified as the background region are expanded.

The process after the expansion of the regions other than the background is the same as that of Embodiment 1, and the expanded regions, which are regions other than the background, are filled in step S16.

Process for Expanding Portion other than Background of Clip Art

Figure 10:
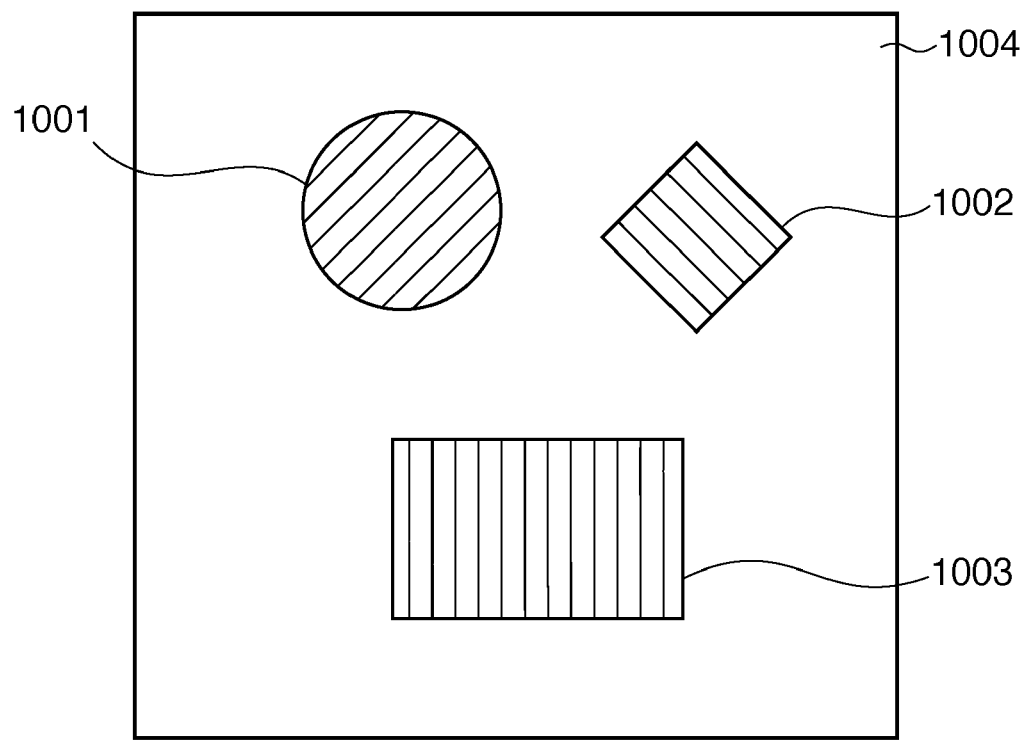
FIG. 10 is a diagram illustrating an example of a clip art region of a document image in image processing according to Embodiment 6 of the present invention.
Figure 11:
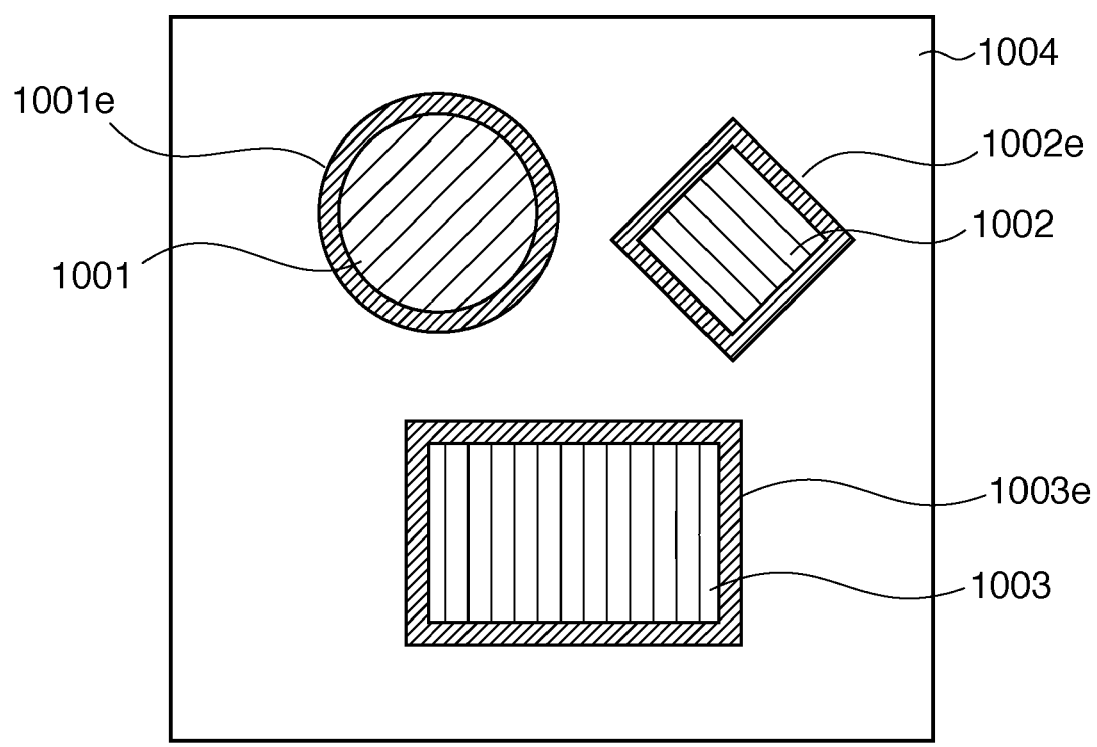
FIG. 11 is a diagram illustrating a result of an expansion process performed on portions other than the background of a clip art region of an example of a document image in image processing according to Embodiment 6 of the present invention.

The process for expanding portions other than the background of a clip art will be described with reference to FIG. 10. FIG. 10 shows an example of a clip art image including a yellow region 1001, a light blue region 1002, a red region 1003 and a white region 1004. In the background identifying process, the white region 1004 is determined as the background region, and the red region 1003, the yellow region 1001 and the light blue region 1002 are determined as portions other than the background. FIG. 11 shows an example of a result in which the portions other than the background of the clip art have been expanded by the expansion process. In each of the colored regions, which are regions other than the background, the border portion where the colored region and the background region contact is expanded by an amount corresponding to expanded portions 1001e, 1002e and 1003e. Finally, the expanded portions are included in the portions other than the background, respectively, and are subjected to the filling process.

As a result, even when there is blurring or the like in the vicinity of the border between the background and an object other than the background, because that region is also filled with the color of the background, the quality of a reproduced image, as well as the compression ratio, can be improved.

Embodiment 7

In the present embodiment, a character region is identified from among the identified non-photo image region before the background is identified, and the identified character region is filled with the color of the background outside the characters.

Overlap of regions occurs frequently in a document image, such as when part of a character region is included in a clip art region of a document image. In such a case, the characters included in the rectangular clip art region need to be filled before the clip art image is subjected to the region division process and the filling process. In the present embodiment, when a character region is included in (or in other words, is overlapping) a clip art region, the character objects are vectorized first. Then, after the character region has been filled, the clip art region is subjected to the vectorization process and the filling process. With this embodiment, the characters can be vectorized with a higher priority.

Figure 12:
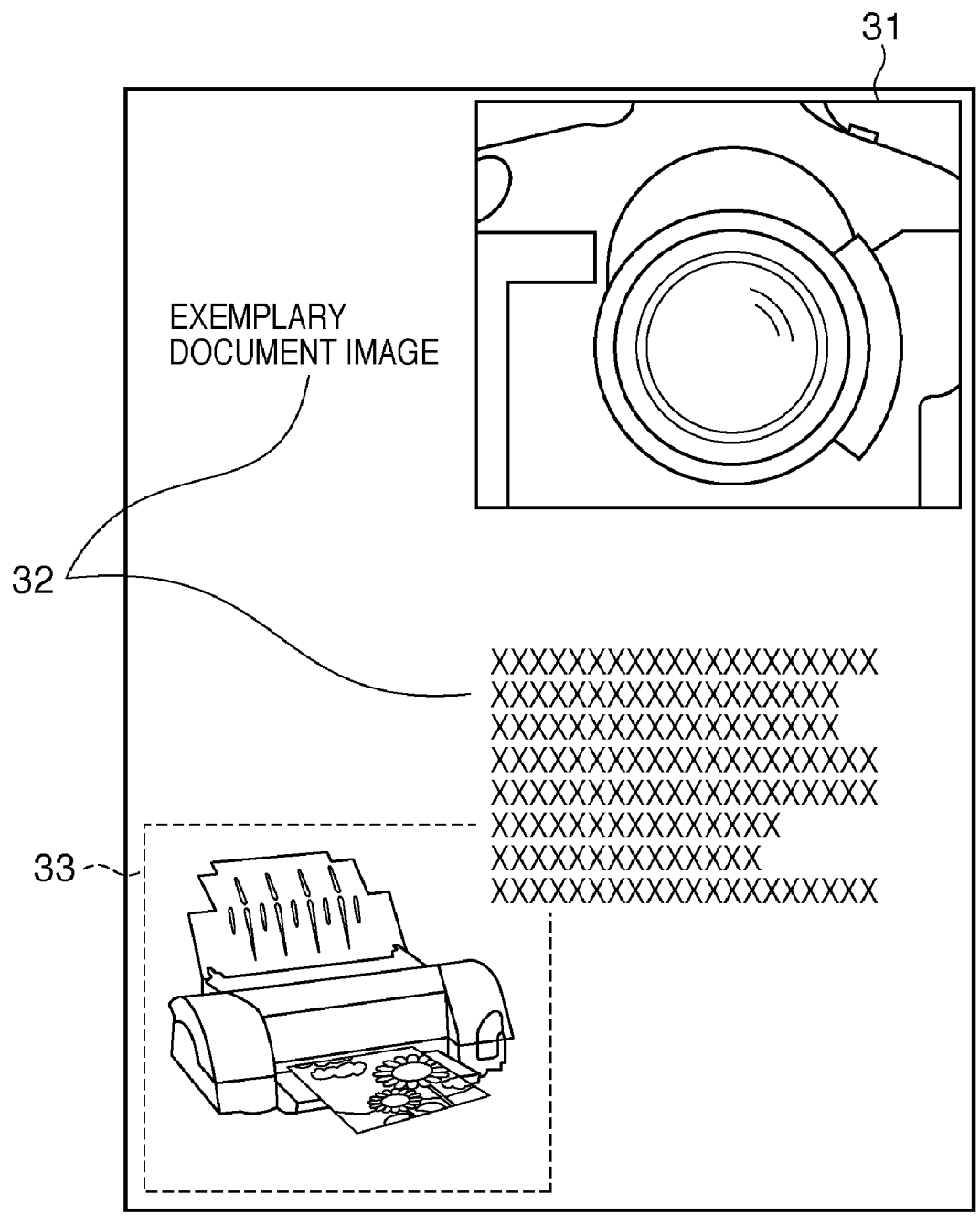
FIG. 12 is a diagram illustrating an example of a document image in which a clip art region and a character region are overlapping each other in image processing of Embodiment 7 of the present invention.
Figure 13:
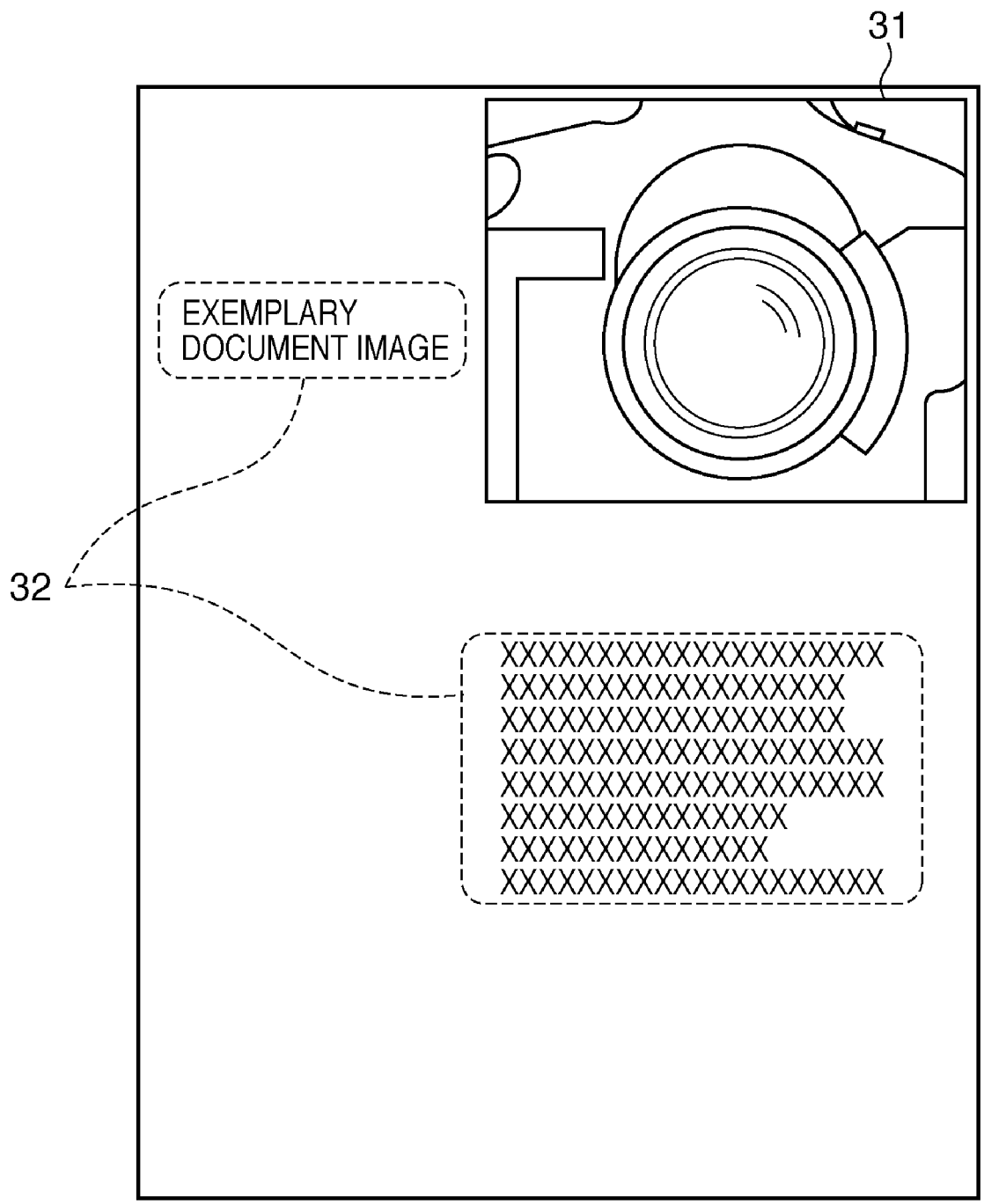
FIG. 13 is a diagram illustrating a result of a clip art region filling process performed on an example of a document image in image processing of Embodiment 7 of the present invention.

FIG. 12 shows an example of a document image in which part of a character region is overlapping a clip art region. In such an image, first of all, the character objects in the character region are vectorized, and then, the character objects are filled. Next, in the clip art region, the clip art region is clustered in colors, vectorized and filled. The JPEG data of the document image in which the clip art region and the character objects have been filled is stored in the compressed data layer, the vector data of the characters and the vector data of the clip art are stored in the vector layer, and a document file is generated. When reproducing this document file, the vector data of the characters and that of the clip art are reproduced on the filled color document image. FIG. 13 shows an example in which the vector data of the characters is reproduced on the filled color document image.

Other Embodiments

Exemplary embodiments have been described in detail above, but the present invention can be achieved in embodiments such as a system, an apparatus, a method, a program, or a storage medium (recording medium). Specifically, it may also be applied to a system configured of multiple devices, or to an apparatus configured of a single device.

The present invention encompasses the case where a software program (a program corresponding to the flowcharts shown in the drawings of the embodiments) that achieves the functions of the above-described embodiments is supplied directly or remotely to a system or an apparatus, and the present invention is achieved by a computer of the system or apparatus reading and executing the supplied program code.

Accordingly, the program code itself installed in the computer so as to achieve the functional process of the present invention through the computer also realizes the present invention. That is, the present invention encompasses the computer program itself for realizing the functional process of the present invention.

In this case, as long as the system or apparatus has the functions of the program, the program can take any form such as object code, a program executed by an interpreter or script data supplied to an OS, etc.

Recording media that can be used for supplying the program include, for example, flexible disk, hard disk, optical disk, magneto-optical disk, MO, CD-ROM, CD-R, CD-RW, magnetic tape, non-volatile memory card, ROM, DVD (DVD-ROM, DVD-R), and so on.

As another method for supplying the program, it is also possible to supply the program by downloading it from an Internet website using a browser of a client computer onto a recording medium such as a hard disk. That is, the program can be supplied by establishing a connection to a website, downloading the computer program of the present invention or a compressed file including an automatic installation function from the website. The present invention can be also achieved by dividing the program code constituting the program of the present invention into a plurality of files, and downloading the files from different websites. In other words, a WWW server that allows a plurality of users to download the program files for realizing the functional process of the present invention through a computer is also included within the scope of the present invention.

In addition, the program of the present invention may be encrypted, stored on a CD-ROM or the like, and distributed to users. In this case, users that have satisfied a predetermined condition are allowed to download key information for decoding the encryption from a website through the Internet, use the key information to execute the encrypted program, and install the program on a computer.

The functions of the above-described embodiments are also implemented by a computer reading the program and executing the read program. In addition, an OS or the like running on the computer performs part or all of the actual processing based on instructions of the program, and the functions of the above-described embodiments may also be implemented through this processing.

Furthermore, the functions of the above-described embodiments may also be implemented after the program read from the recording medium is written into a memory provided in a function expansion board inserted into the computer or a function expansion unit connected to the computer. That is, a CPU or the like mounted on the function expansion board or function expansion unit performs all or part of the actual processing based on instructions of the program so that the functions of the foregoing embodiment can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-120763, filed on May 2, 2008, which is hereby incorporated by reference herein in its entirety.

What is claimed is:

1. An image processing apparatus that encodes a document image including a non-photo image region, the apparatus comprising:
   a region identify unit adapted to perform region separation on a document image and identify a non-photo image region;
   a first encoder adapted to encode the non-photo image region through a vectorization process;
   a background identify unit adapted to identify a background region from the non-photo image region;
   a filling unit adapted to fill a region other than the background region of the non-photo image region with a color of the background region; and
   a second encoder adapted to encode the document image after the region other than the background region of the non-photo image region has been filled by said filling unit, through an image compressing process, and
   wherein the background identify unit divides the non-photo image region into clusters, each cluster comprising a group of pixels whose distance to a reference color of the cluster is less than or equal to a reference value, and
   the background identify unit identifies a cluster that is in an end portion of the non-photo image region and includes a largest number of pixels located in the end portion as the background region.

2. The image processing apparatus according to claim 1, wherein when a photo image region overlaps the non-photo image region, the background identify unit identifies the photo image region as the background region.

3. The image processing apparatus according to claim 1, wherein the background identify unit expands a perimeter of a cluster identified as the background from the non-photo image region to a preset width, and includes the expanded portion in the background region.

4. The image processing apparatus according to claim 1, further comprising:
   a character region identify unit adapted to identify a character region from the non-photo image region identified by the region identify unit before the background is identified by the background identify unit; and
   a filling unit adapted to fill the character region with a color of the background outside the characters.

5. The image processing apparatus according to claim 1, wherein the first encoder generates vector data for the region other than the background region of the non-photo image region.

6. The image processing apparatus according to claim 1, further comprising:
   a document file generation unit adapted to generate a document file in which vector data generated through encoding by the first encoder and compressed data obtained through encoding by the second encoder are stored.

7. An image processing apparatus that encodes a document image including a non-photo image region, the apparatus comprising:
   a region identify unit adapted to perform region separation on a document image and identify a non-photo image region;
   a first encoder adapted to encode the non-photo image region through a vectorization process;
   a background identify unit adapted to identify a background region from the non-photo image region;
   a filling unit adapted to fill a region other than the background region of the non-photo image region with a color of the background region; and
   a second encoder adapted to encode the document image after the region other than the background region of the non-photo image region has been filled by said filling unit, through an image compressing process, and
   wherein the background identify unit divides the non-photo image region into clusters, each cluster comprising a group of pixels whose distance to a reference color of the cluster is less than or equal to a reference value, and
   the background identify unit defines a sample region including an end portion of the non-photo image region in the non-photo image region, and identifies a cluster to which a largest number of pixels of the sample region belong as the background region.

8. An image processing apparatus that encodes a document image including a non-photo image region, the apparatus comprising:
   a region identify unit adapted to perform region separation on a document image and identify a non-photo image region;
   a first encoder adapted to encode the non-photo image region through a vectorization process;
   a background identify unit adapted to identify a background region from the non-photo image region;
   a filling unit adapted to fill a region other than the background region of the non-photo image region with a color of the background region; and
   a second encoder adapted to encode the document image after the region other than the background region of the non-photo image region has been filled by said filling unit, through an image compressing process, and
   wherein the background identify unit divides the non-photo image region into clusters, each cluster comprising a group of pixels whose distance to a reference color of the cluster is less than or equal to a reference value, and
   the background identify unit identifies, as the background region, a cluster that has a color whose saturation is smaller than a preset reference saturation, and whose number of pixels is larger than a preset reference number of pixels.

9. An image processing apparatus that encodes a document image including a non-photo image region, the apparatus comprising:
   a region identify unit adapted to perform region separation on a document image and identify a non-photo image region;
   a first encoder adapted to encode the non-photo image region through a vectorization process;
   a background identify unit adapted to identify a background region from the non-photo image region;
   a filling unit adapted to fill a region other than the background region of the non-photo image region with a color of the background region; and
   a second encoder adapted to encode the document image after the region other than the background region of the non-photo image region has been filled by said filling unit, through an image compressing process, and
   wherein the background identify unit divides the non-photo image region into clusters, each cluster comprising a group of pixels whose distance to a reference color of the cluster is less than or equal to a reference value, and
   if the clusters include a certain cluster whose number of pixels differs from a cluster having a largest number of pixels by an amount that is less than or equal to a reference value, the background identify unit identifies, as the background region, a cluster with a lowest color saturation among clusters including the cluster having the largest number of pixels and the certain cluster.

10. A non-transitory computer readable storage medium storing a program for encoding a document image including a non-photo image region, the program causing a computer to function as:
    a region identify unit adapted to perform region separation on a document image and identify a non-photo image region;
    a first encoder adapted to encode the non-photo image region through a vectorization process;
    a background identify unit adapted to identify a background region from the non-photo image region;
    a filling unit adapted to fill a region other than the background region of the non-photo image region with a color of the background region; and
    a second encoder adapted to encode the document image after the region other than the background region of the non-photo image region has been filled by said filling unit, through an image compressing process, and
    wherein the background identify unit divides the non-photo image region into clusters, each cluster comprising a group of pixels whose distance to a reference color of the cluster is less than or equal to a reference value, and the background identify unit identifies a cluster that is in an end portion of the non-photo image region and includes a largest number of pixels located in the end portion as the background region.

11. A non-transitory computer readable storage medium storing a program for encoding a document image including a non-photo image region, the program causing a computer to function as:
　　a region identify unit adapted to perform region separation on a document image and identify a non-photo image region;
　　a first encoder adapted to encode the non-photo image region through a vectorization process;
　　a background identify unit adapted to identify a background region from the non-photo image region;
　　a filling unit adapted to fill a region other than the background region of the non-photo image region with a color of the background region; and
　　a second encoder adapted to encode the document image after the region other than the background region of the non-photo image region has been filled by said filling unit, through an image compressing process, and
　　wherein the background identify unit divides the non-photo image region into clusters, each cluster comprising a group of pixels whose distance to a reference color of the cluster is less than or equal to a reference value, and
　　the background identify unit defines a sample region including an end portion of the non-photo image region in the non-photo image region, and identifies a cluster to which a largest number of pixels of the sample region belong as the background region.

12. A non-transitory computer readable storage medium storing a program for encoding a document image including a non-photo image region, the program causing a computer to function as:
　　a region identify unit adapted to perform region separation on a document image and identify a non-photo image region;
　　a first encoder adapted to encode the non-photo image region through a vectorization process;
　　a background identify unit adapted to identify a background region from the non-photo image region;
　　a filling unit adapted to fill a region other than the background region of the non-photo image region with a color of the background region; and
　　a second encoder adapted to encode the document image after the region other than the background region of the non-photo image region has been filled by said filling unit, through an image compressing process, and
　　wherein the background identify unit divides the non-photo image region into clusters, each cluster comprising a group of pixels whose distance to a reference color of the cluster is less than or equal to a reference value, and
　　the background identify unit identifies, as the background region, a cluster that has a color whose saturation is smaller than a preset reference saturation, and whose number of pixels is larger than a preset reference number of pixels.

13. A non-transitory computer readable storage medium storing a program for encoding a document image including a non-photo image region, the program causing a computer to function as:
　　a region identify unit adapted to perform region separation on a document image and identify a non-photo image region;
　　a first encoder adapted to encode the non-photo image region through a vectorization process;
　　a background identify unit adapted to identify a background region from the non-photo image region;
　　a filling unit adapted to fill a region other than the background region of the non-photo image region with a color of the background region; and
　　a second encoder adapted to encode the document image after the region other than the background region of the non-photo image region has been filled by said filling unit, through an image compressing process, and
　　wherein the background identify unit divides the non-photo image region into clusters, each cluster comprising a group of pixels whose distance to a reference color of the cluster is less than or equal to a reference value, and
　　if the clusters include a certain cluster whose number of pixels differs from a cluster having a largest number of pixels by an amount that is less than or equal to a reference value, the background identify unit identifies, as the background region, a cluster with a lowest color saturation among clusters including the cluster having the largest number of pixels and the certain cluster.

14. An image encoding method performed by an image processing apparatus that encodes a document image including a non-photo image region, the method comprising the steps of:
　　performing region separation on a document image and identifying a non-photo image region;
　　encoding the non-photo image region through a vectorization process;
　　identifying a background region from the non-photo image region;
　　filling a region other than the background region of the non-photo image region with a color of the background region; and
　　encoding the document image after the region other than the background region of the non-photo image region has been filled in said filling step, through an image compressing process, and
　　wherein the background identify step divides the non-photo image region into clusters, each cluster comprising a group of pixels whose distance to a reference color of the cluster is less than or equal to a reference value, and
　　the background identify step identifies a cluster that is in an end portion of the non-photo image region and includes a largest number of pixels located in the end portion as the background region.

15. An image encoding method performed by an image processing apparatus that encodes a document image including a non-photo image region, the method comprising the steps of:
　　performing region separation on a document image and identifying a non-photo image region;
　　encoding the non-photo image region through a vectorization process;
　　identifying a background region from the non-photo image region;
　　filling a region other than the background region of the non-photo image region with a color of the background region; and
　　encoding the document image after the region other than the background region of the non-photo image region has been filled in said filling step, through an image compressing process, and wherein the background identify step divides the non-photo image region into clusters, each cluster comprising a group of pixels whose distance to a reference color of the cluster is less than or equal to a reference value, and the background identify step defines a sample region including an end portion of the non-photo image region in the non-photo image region, and identifies a cluster to which a largest number of pixels of the sample region belong as the background region.

16. An image encoding method performed by an image processing apparatus that encodes a document image including a non-photo image region, the method comprising the steps of:

performing region separation on a document image and identifying a non-photo image region;

encoding the non-photo image region through a vectorization process;

identifying a background region from the non-photo image region;

filling a region other than the background region of the non-photo image region with a color of the background region; and encoding the document image after the region other than the background region of the non-photo image region has been filled in said filling step, through an image compressing process, and wherein the background identify step divides the non-photo image region into clusters, each cluster comprising a group of pixels whose distance to a reference color of the cluster is less than or equal to a reference value, and the background identify step identifies, as the background region, a cluster that has a color whose saturation is smaller than a preset reference saturation, and whose number of pixels is larger than a preset reference number of pixels.

17. An image encoding method performed by an image processing apparatus that encodes a document image including a non-photo image region, the method comprising the steps of:

performing region separation on a document image and identifying a non-photo image region;

encoding the non-photo image region through a vectorization process;

identifying a background region from the non-photo image region;

filling a region other than the background region of the non-photo image region with a color of the background region; and encoding the document image after the region other than the background region of the non-photo image region has been filled in said filling step, through an image compressing process, and wherein the background identify step divides the non-photo image region into clusters, each cluster comprising a group of pixels whose distance to a reference color of the cluster is less than or equal to a reference value, and if the clusters include a certain cluster whose number of pixels differs from a cluster having a largest number of pixels by an amount that is less than or equal to a reference value, the background identify step identifies, as the background region, a cluster with a lowest color saturation among clusters including the cluster having the largest number of pixels and the certain cluster.

* * * * *